(12) United States Patent
Momoda et al.

(10) Patent No.: US 11,807,769 B2
(45) Date of Patent: Nov. 7, 2023

(54) PRIMER COMPOSITION FOR OPTICAL ARTICLES, AND LAMINATE

(71) Applicant: Tokuyama Corporation, Yamaguchi (JP)

(72) Inventors: Junji Momoda, Yamaguchi (JP); Shinobu Izumi, Yamaguchi (JP); Taichi Hanasaki, Yamaguchi (JP)

(73) Assignee: Tokuyama Corporation, Yamaguchi (JP)

( * ) Notice: Subject to any disclaimer, the term of this patent is extended or adjusted under 35 U.S.C. 154(b) by 959 days.

(21) Appl. No.: 16/621,388

(22) PCT Filed: Jun. 11, 2018

(86) PCT No.: PCT/JP2018/022265
§ 371 (c)(1),
(2) Date: Dec. 11, 2019

(87) PCT Pub. No.: WO2018/230513
PCT Pub. Date: Dec. 20, 2018

(65) Prior Publication Data
US 2020/0231840 A1 Jul. 23, 2020

(30) Foreign Application Priority Data

Jun. 14, 2017 (JP) .................. 2017-116437
Jan. 16, 2018 (JP) .................. 2018-004934
Feb. 15, 2018 (JP) .................. 2018-024719
Apr. 10, 2018 (JP) .................. 2018-075612

(51) Int. Cl.
| | |
|---|---|
| *C09D 175/04* | (2006.01) |
| *G02B 1/14* | (2015.01) |
| *C09D 7/63* | (2018.01) |
| *C08G 18/12* | (2006.01) |
| *C08G 18/32* | (2006.01) |
| *C08G 18/48* | (2006.01) |
| *C08G 18/66* | (2006.01) |
| *C08G 18/76* | (2006.01) |
| *C09D 5/32* | (2006.01) |
| *G02B 1/04* | (2006.01) |
| *G02C 7/10* | (2006.01) |

(52) U.S. Cl.
CPC ........... *C09D 175/04* (2013.01); *C08G 18/12* (2013.01); *C08G 18/3206* (2013.01); *C08G 18/4854* (2013.01); *C08G 18/6611* (2013.01); *C08G 18/7621* (2013.01); *C09D 5/32* (2013.01); *C09D 7/63* (2018.01); *G02B 1/04* (2013.01); *G02B 1/14* (2015.01); *G02C 7/104* (2013.01); *G02C 2202/16* (2013.01)

(58) Field of Classification Search
CPC .............. C09D 175/04–08; C09D 5/32; G02C 7/10–12; G02B 1/04; G02B 1/041
See application file for complete search history.

(56) References Cited

U.S. PATENT DOCUMENTS

| | | | |
|---|---|---|---|
| 9,023,424 B2 | 5/2015 | Otani et al. | |
| 2007/0127133 A1 | 6/2007 | Momoda et al. | |
| 2008/0094704 A1* | 4/2008 | Kimura ............... | G02B 27/0018 |
| | | | 428/335 |
| 2012/0223259 A1 | 9/2012 | Hashizume et al. | |
| 2015/0370094 A1 | 12/2015 | Hashimoto et al. | |
| 2016/0238758 A1* | 8/2016 | Turpen ..................... | C08J 7/046 |
| 2016/0304701 A1 | 10/2016 | Kakinuma et al. | |
| 2018/0016415 A1 | 1/2018 | Kakinuma et al. | |

FOREIGN PATENT DOCUMENTS

| | | |
|---|---|---|
| EP | 1916097 A2 | 4/2008 |
| JP | H01230003 A | 9/1989 |
| JP | H09265059 A | 10/1997 |
| JP | 2001288406 A | 10/2001 |
| JP | 2005338868 A | 12/2005 |
| JP | 2009237003 A | 10/2009 |
| JP | 2012186305 A | 9/2012 |
| JP | 2013238634 A | 11/2013 |
| JP | 2016157146 A | 9/2016 |
| WO | 2005075193 A1 | 8/2005 |
| WO | 2008001875 A1 | 1/2008 |
| WO | 2014133111 A1 | 9/2014 |
| WO | 2015088015 A | 6/2015 |
| WO | 2016125736 A1 | 8/2016 |

(Continued)

OTHER PUBLICATIONS

Morita et al (Mixture Dyeing. vol. 38, No. 12, pp. 2041-2044. (Year: 1965).*
English Abstract of JP 2012186305A, Sep. 27, 2012.
European Patent Office, Extended Search Report for Application No. EP18818382.6, dated Mar. 2021.
Technical Information, Uvinul 3050, "UV Absorber for Plastics and Paints," BASF, 1995, pp. 1-5, retrieved on Sep. 15, 2020.
Technical Information, Tinuvin 900, BASF, 2011, pp. 1-3, retrieved on Sep. 14, 2020.
WIPO PCT International Preliminary Report on Patentability, PCT/JP2018/022265, dated Dec. 26, 2019.
English Abstract of JPH01230003 A, Sep. 13, 1989.
English Abstract of JP2001288406 A, Oct. 16, 2001.

(Continued)

*Primary Examiner* — Michael M Dollinger
(74) *Attorney, Agent, or Firm* — CAHN & SAMUELS, LLP

(57) ABSTRACT

A primer composition for optical articles includes (A) a urethane prepolymer which is a reaction product of an aromatic polyisocyanate compound and a polyol compound, and which has a reactive group at an end, the reactive group being selected from among an isocyanate group and a hydroxyl group, (B) a light absorbing compound which has a maximum absorption wavelength within the range of from 320 nm to 650 nm (inclusive) and (C) an organic solvent which has a solubility parameter of 8 $(cal/cm^3)^{1/2}$ or more, while containing no active hydrogen.

16 Claims, No Drawings

(56) References Cited

FOREIGN PATENT DOCUMENTS

WO     WO-2018230513 A1 * 12/2018 ............. B32B 27/18

OTHER PUBLICATIONS

English Abstract of WO2008001875 A1, Jan. 3, 2008.
English Abstract of JP2009237003 A, Oct. 15, 2009.
English Abstract of JP2013238634 A, Nov. 28, 2013.
English Abstract for JP2005338868 A, Dec. 8, 2005.
English Abstract of WO2014133111 A1, Sep. 4, 2014.
English Abstract of JP2016157146 A, Sep. 1, 2016.
English Abstract of WO2015088015 A1, Jun. 18, 2015.
English Abstract of WO2016125736 A1, Aug. 11, 2016.
English Abstract of JPH09265059 A, Oct. 7, 1997.
English Abstract of WO2005075193 A1, Aug. 18, 2005.

* cited by examiner

PRIMER COMPOSITION FOR OPTICAL ARTICLES, AND LAMINATE

This application is a U.S. national stage application of PCT/JP2018/022265 filed on 11 Jun. 2018 and claims priority to Japanese patent documents JP 2017-116437 filed on 14 Jun. 2017; JP 2018-004934 filed on 16 Jan. 2018; JP 2018-024719 filed on 15 Feb. 2018; and JP 2018-075612 filed on 10 Apr. 2018, the entireties of which are incorporated herein by reference.

TECHNICAL FIELD

The present invention relates to a novel primer composition for forming an optical article having excellent ultraviolet absorbing property (including blue light-absorbing property) and an anti-glare property.

BACKGROUND OF THE INVENTION

It is known that ultraviolet ray included in sun light has adverse effect to eyes, thus in order to protect eyes, conventionally, an optical article providing ultraviolet absorbing property to eyeglasses is commercially available. Further, in recent years, it has become apparent that blue light included in black light of a liquid display used in computer, TV, and mobile phone has adverse effect on eyes, and thus the optical article such as eyeglasses having a function to protect eyes from such light is demanded. Specifically, ultraviolet absorbing property and blue light absorbing property are provided to eyeglasses. Furthermore, an anti-glare property is demanded for the eyeglasses.

Currently, the eyeglasses using an optical substrate made of plastic is a main stream since it has good processing property and durability. As a method of providing an ultraviolet absorbing property to the optical substrate made of plastic lens, following method is known.

(i) a method of immersing a plastic lens substrate in a solution dispersed with an ultraviolet absorbing agent (hereinafter, it may be simply referred as "an immersion method") (see Patent Documents 1 and 2), (ii) a method of dispersing an ultraviolet absorbing agent to a plastic lens monomer forming a lens substrate and then molding (hereinafter, it may be referred as "a lens substrate dispersion method") (see Patent Documents 3 to 6), and (iii) a method of dispersing an ultraviolet absorbing agent to a hard coat layer formed to a surface of a plastic lens substrate in order to improve an anti-scratch property (hereinafter, it may be simply referred as "a hard coat layer dispersion method") (see Patent Documents 7 and 8).

However, there was still room for improvement in the above mentioned conventional methods. First, in the immersion method mentioned in the above section (i), it is necessary to regulate the ultraviolet absorbing agent impregnated to the plastic lens substrate to a constant amount. Thus, there was room for improvement in a sense that the plastic lens substrate is limited to a material capable of regulating the impregnation amount. That is, since some plastic lens substrates cannot regulate the ultraviolet absorbing agent to a constant amount, the immersion method was not suited for general use.

Also, the lens substrate dispersion method mentioned in the above section (ii) cannot correspond to a difference of the thickness of the plastic lens substrate. The ultraviolet absorbing property differs depending on the thickness of the substrate such as plastic lens substrate. In case the substrate is a myopia correction lens, a center part of the lens is thin and an end part of the lens is thicker. Therefore, in the center part and the end part of the lens, the amount of the ultraviolet absorbing agent existing on optical path is different. As a result, the ultraviolet absorbing property differs between the center part and the end part of the lens. When the center part of the lens is used as a standard, then it is necessary to use excessive amount of the ultraviolet absorbing agent; and when the end part of the lens is used as a standard, then the ultraviolet absorbing agent is not enough which causes insufficient ultraviolet absorbing property at the center part of the lens. Also, when using the ultraviolet absorbing agent or the blue light absorbing agent having absorbing range at near-ultraviolet region, pigmentation tends to easily occur. Therefore, for the lens having different thickness at the center part and the end part, when the ultraviolet absorbing agent was blended, it was difficult to maintain high transparency over entire glass surface.

On the contrary to the above mentioned methods, for the hard coat layer dispersion method in the above section (iii), usually the hard coat layer formed on the substrate forms a layer having uniform thickness, thus problems which occurred in the lens substrate dispersion method does not occur. Also, since a plastic lens is formed on the substrate, wide range of materials (substrate) can be used unlike in case of the immersion method in which the type of the plastic lens substrate was selective.

[Patent document 1] JP Patent Application Publication No. H01-230003

[Patent document 2] JP Patent Application Publication No. 2005-338868

[Patent document 3] WO Patent Application Publication No. 2014-133111

[Patent document 4] JP Patent Application Publication No. 2016-157146

[Patent document 5] WO Patent Application Publication No. 2015-088015

[Patent document 6] WO Patent Application Publication No. 2016-125736

[Patent document 7] JP Patent Application Publication No. H09-265059

[Patent document 8] WO Patent Application Publication No. 2005-075193

BRIEF SUMMARY OF THE INVENTION

However, according to keen study by the present inventors, the hard coat layer dispersion method has room for improvement in following points. Usually, a hard coat composition forming the hard coat layer is made of inorganic particles such as silica particles and the like, and a compound such as a hydrolysable group containing organic silica compound (for example alkoxy silane) which forms macromolecule by condensation reaction. According to the keen study by the present inventors, in order to sufficiently block ultraviolet ray and purple to blue light having wavelength of 400 nm or more, it was found that the added amount of the light absorbing agent needs to be increased and the hard coat layer needs to be thicker. As a result, according to the hard coat layer dispersion method, in some case it was difficult to improve the anti-scratch property of the hard coat layer itself while maintaining the high light-absorbing property; and cracks and the like occurred which resulted in bad appearance, hence it still had room for improvement. Also, recently, due to the widespread of smart phones and the like, a lens which can absorb blue light is demanded more and more, thus a material for the optical article and an optical article using the material which can easily give such property is demanded. Further, for human eyes, light having wavelength of 540 to 650 nm (yellow to orange light) is perceived as brightest light, thus an optical article which can absorb the light having wavelength within such range is also in demand.

Therefore, the object of the present invention is to provide a material capable of easily producing an optical article such as plastic lens having excellent ultraviolet absorbing property, blue light absorbing property, and anti-glare property. Further specifically, the object of the present invention is to provide a primer composition for optical article which can be used to a substrate of various materials and having absorbing property against light having specific wavelength.

Means for Solving Problem

The present inventors have carried out keen study to attain the above object. Conventionally, the main stream methods were the lens substrate dispersion method capable of blending large amount of the light absorbing agent and the hard coat layer dispersion method which uses a hard coat layer existing at an incident plane of light as an ultraviolet absorbing layer. However, the present inventors have studied a completely different method from the above methods and have considered to use a layer different from the conventional layer as the light absorbing layer. The preset inventors focused on a so-called primer layer (a primer layer for optical article) used to bind a substrate and other layers, and considered of blending a light absorbing agent to the primer layer. As a result, the present inventors have attained the above object by blending light absorbing compound to a composition which includes specific organic solvent and a specific urethane prepolymer having a reactive group at a terminal end as a main component; thereby the present invention was attained. As mentioned in above, conventionally it has not been considered of using the primer layer (a layer having a reaction product of the urethane prepolymer as a matrix (mother material)) made of the primer composition for such optical article as the light absorbing layer.

That is, the Present Invention is, (1) a primer composition for optical article having
a urethane prepolymer (A) which is a reaction product of an aromatic polyisocyanate compound and a polyol compound, and has a reactive group at a terminal end selected from the group consisting of an isocyanate group or a hydroxyl group,
a light-absorbing compound (B) having a local maximum light-absorption wavelength between 320 nm or more and 650 nm or less (hereinafter it may be simply referred as "a light-absorbing compound (B)"), and
an organic solvent (C) having a solubility parameter of 8 $[(cal/cm^3)^{1/2}]$ or more and has no active hydrogen.

The present invention can have following embodiments.

(2) The primer composition for optical article according to (1), wherein a mass of the reactive group of the urethane prepolymer (A) is within a range of 0.02 to 0.2 g (0.02 to 0.2 grams) per 1 g (1 gram) of the urethane prepolymer (A).

(3) The primer composition for optical article according to (1) or (2) including 0.01 to 20 parts by mass of the light-absorbing compound (B) and 100 to 1000 parts by mass of the organic solvent (C) per 100 parts by mass of the urethane prepolymer (A).

(4) The primer composition for optical article according to any one of (1) to (3), wherein the urethane prepolymer (A) is a reaction product of an aromatic polyisocyanate compound, a polyol compound, and a chain extender.

(5) The primer composition for optical article according to any one of (1) to (4), wherein a weight average molecular weight of the urethane prepolymer (A) is 3,000 to 300,000.

(6) The primer composition for optical article according to any one of (1) to (5), wherein the light-absorbing compound (B) includes a component (B1) having a local maximum light-absorption wavelength of more than 400 nm and 450 nm or less.

(7) The primer composition for optical article according to (6), wherein the component (B1) includes a porphyrin compound.

(8) The primer composition for optical article according to any one of (1) to (7), wherein the light-absorbing compound (B) includes an ultraviolet absorbing agent (B2) having a local maximum light-absorption wavelength of 320 nm or more and 400 or less.

(9) The primer composition for optical article according to any one of (1) to (8), wherein the light-absorbing compound (B) further includes a dye (B3) having the maximum light-absorption wavelength of 540 nm or more and 650 or less.

(10) The primer composition for optical article according to any one of (1) to (9) further including a leveling agent (D).

(11) The primer composition for optical article according to any one of (1) to (10), wherein the reactive group of the urethane prepolymer (A) is an isocyanate group and the urethane prepolymer (A) is a moisture curing polymer which cures by moisture in air.

(12) The primer composition for optical article according to any one of (1) to (10), wherein the reactive group of the urethane prepolymer (A) is a hydroxyl group and further includes a curing agent (E) having a plurality of isocyanate groups in a molecule.

(13) The primer composition for optical article according to any one of (1) to (11), wherein the reactive group of the urethane prepolymer (A) is an isocyanate group and further includes a curing agent (E') having a plurality of functional groups which can react with an isocyanate group in a molecule.

(14) A primary multilayer body having a primer layer made of the primer composition for optical article compound according to any one of (1) to (13) on a surface of an optical substrate and a thickness of the primer layer is 0.1 to 20 μm.

(15) The primary multilayer body according to (14), wherein a transmittance at a wavelength of 420 nm is 80% or less.

(16) A secondary multilayer body having a hard coat layer including inorganic particles on the primer layer of the primary multilayer body according to (14) or (15).

Note that, in the present invention, the local maximum light-absorption wavelength of each compound was measured in a solvent which does not influence the measurement. As the solvent, for example, chloroform may be mentioned.

By using the primer composition for optical article of the present invention, the ultraviolet absorbing property, the blue light absorbing property, or the anti-glare property can be effectively provided to the optical article such as the plastic lens substrate and the like, and also these properties can be provided all at the same time to the optical article such as a the plastic lens substrate and the like, thus it is highly usable.

DETAILED DESCRIPTION OF THE INVENTION

A primer composition for optical article of the present invention is a composition having a urethane prepolymer (A) which is a reaction product of an aromatic polyisocyanate compound and a polyol compound and has a reactive group at a terminal end selected from the group consisting of an isocyanate group or a hydroxyl group, a light-absorbing compound (B) having a local maximum light-absorption wavelength between 320 nm or more and 650 nm or less, and an organic solvent (C) having a solubility parameter of 8 $[(cal/cm^3)^{1/2}]$ or more and has no active hydrogen.

Hereinafter, each component is described.

Urethane Prepolymer (A) (Hereinafter, it May be Referred as "Component (A)")

According to the present invention, a component (A) forms a resin component (matrix) dispersed with the light-absorbing compound (B) in a primer layer of the optical article (a layer made from the primer composition for optical article of the present invention). Further, the component (A) for example has a function to improve adhesion between an optical substrate such as a plastic lens substrate and a hard coat layer.

In the present invention, the component (A) is a reaction product of an aromatic polyisocyanate compound (hereinafter, it may be simply referred as "a component (A1)") and a polyol compound (hereinafter, it may be referred as "a component (A2)"). Further, the component (A) is formed by adjusting the ratio of the amount of the component (A1) and the component (A2) so that a reactive group is left at a terminal end of the component (A).

The reactive group of the component (A) is isocyanate group (NCO group) or hydroxyl group (OH group). That is, the component (A) is urethane prepolymer having an aromatic ring and also has the reactive group at the terminal end selected from isocyanate group or hydroxyl group.

Specifically, as the component (A1) constituting the component (A), compounds described in below may be mentioned.

<Constituting Component "Component (A1)"; Aromatic Polyisocyanate Compound>

The component (A1) is a compound having an aromatic ring and two or more of isocyanate groups in the molecule. In the present embodiment, by using the component (A1), compared to other isocyanate compounds such as aliphatic polyisocyanate compound, the component (A1) has faster curing reaction and also a hardness of the obtained coating (primer layer) can be increased.

Further, among the aromatic polyisocyanate compound, considering a smoothness of the primer layer formed; a dispersion of the light-absorbing compound (B), other additives, and the like in the primer layer; an adhesion of the primer layer (adhesion between the hard coat layer and the substrate); and the like, preferably two to three isocyanate groups are included in the molecule. Also, although it is not particularly limited, in order to exhibit the above effects, the compound having a molecular weight of 160 to 500 (g/mol) is preferably used.

As specific examples of the component (A1), aromatic diisocyanate compounds such as 4,4'-diphenylmethane diisocyanate, 4,2'-diphenylmethane diisocyanate, tolylene-2,4-diisocyanate, tolylene-2,6-diisocyanate, tolylene-2,3-diisocyanate, phenylene-1,3-diisocyanate, phenylene-1,4-diisocyanate, 1,3-bis(isocyanatomethyl) benzene, xylylene diisocyanate, tetramethylxylylene diisocyanate, naphthalene diisocyanate, diphenyl ether diisocyanate, 1,3-diisocyanatomethylbenzene, 4,4'-diisocyanato-3,3'-dimethoxy (1,1'-biphenyl), 4,4'-diisocyanato-3,3'-dimethylbiphenyl, 1,2-diisocyanatobenzene, 1,4-bis(isocyanatomethyl)-2,3,5,6-tetrachlorobenzene, 2-dodecyl-1,3-diisocyanatobenzene, 1-isocyanato-4-[(2-isocyanatocyclohexyl)methyl]2-methylbenzene, 1-isocyanato-3-[(4-isocyanatophenyl)methyl]-2-methylbenzene, 4-[(2-isocyanatophenyl)oxy]phenyl isocyanate, diphenylmethane diisocyanate, tolidine diisocyanate, triphenylmethane triisocyanate, and the like may be mentioned. The component (A1) may be single compound mentioned in above, a mixture of isomers, or plurality of the above mentioned compounds may be used together.

Among these, aromatic isocyanate compounds such as tolylene diisocyanate, 4,4'-diphenylmethane diisocyanate, 1,5-naphthalene diisocyanate, tolidine diisocyanate, triphenylmethane triisocyanate, tetramethylxylylene diisocyanate, and the like are suitably used. The reason for this is because the aromatic isocyanate compounds have excellent curing reaction rate compared to aliphatic isocyanate compounds, and also the aromatic isocyanate compounds can provide a higher hardness to the obtained coating. Among the above mentioned aromatic isocyanate compounds, tolylene diisocyanate and 4,4'-diphenylmethane diisocyanate are particularly preferable. In case of using tolylene diisocyanate, a mixture of tolylene-2,4-diisocyanate (50 to 90 mass %) and tolylene-2,6-diisocyanate (10 to 50 mass %) is preferably used since it is easy to obtain raw materials.

Next, the polyol compound (A2) is described.

<Constituting Component "Polyol Compound (A2)">

In the present invention, the component (A2) is a compound having two or more hydroxyl groups in the molecule.

The polyol compound of the present invention preferably includes two to three hydroxyl groups in the molecule considering the smoothness of the formed primer layer; the dispersion of the light-absorbing compound (B), other additives, and the like in the primer layer; and the adhesion of the primer layer (the adhesion between the hard coat layer and the substrate). Also, although it is not particularly limited, in order to exhibit the above effects, it is preferable to use the compound having the molecular weight of 90 to 5000. Note that, the molecular weight is a number average molecular weight obtained by measuring using GPC.

In the present invention, as the component (A2), alkylene glycol, polyalkylene glycol, poly(alkylene adipate), polycaprolactone polyol, polybutadiene glycol, polyester polyol, polyol having three or more hydroxyl groups, or silicone polyol may be mentioned.

As specific examples of the component (A2), polyol compounds such as, alkylene glycols such as ethylene glycol, 1,2-propylene glycol, 1,3-butanediol, 1,4-butanediol, 1,6-hexanediol, neopentyl glycol, dipropylene glycol, diethylene glycol, and the like;

polyalkylene glycols such as polypropylene glycol, polyethylene glycol, polytetramethylene glycol, and the like;

poly(alkylene adipate) such as poly(diethylene adipate), poly(tetramethylene adipate), poly(hexamethylene adipate), poly(neopentylene adipate), and the like;

polycaprolactone polyols such as poly-ε-caprolactone, polycaprolactone diol, polycaprolactone triol, and the like;

polybutadiene glycols such as poly(1,4-butadiene) glycol, poly(1,2-butadiene) glycol, and the like;

poly(alkylene carbonate) such as poly(hexamethylene carbonate) and the like;

polyester polyols;

polyols having three or more hydroxyl groups such as glycerin, trimethylolpropane, pentaerythritol, 1,2,4-butanetriol, 1,2,6-hexanetriol, and the like;

silicone polyols;

polycarbonate polyols obtained by phosgenation of one or more of low molecular weight polyol compounds or transesterification of ethylene carbonate, diethyl carbonate, and diphenyl carbonate with low molecular weight carbonate (as the low molecular weight polyol compounds, above mentioned alkylene glycol may be mentioned);

polyester polyols obtained by condensation reaction of polyvalent alcohol compounds and polybasic acids (As the polyvalent alcohol compounds, alkylene glycol and polyalkylene glycol may be mentioned. Also, as polybasic acids, succinic acid, adipic acid, azelaic acid, sebacic acid, dodecanedicarboxylic acid, cyclopentanedicarboxylic acid, cyclohexanedicarboxylic acid, orthophthalic acid, isophthalic acid, terephthalic acid, naphthalenedicarboxylic acid, and the like may be mentioned.); and the like may be mentioned.

Among these, polyalkylene glycol, polyol having three hydroxyl groups, polyalkylene adipate, polycarbonate polyol, polycaprolactone polyol, and polyester polyol can further lower a heating temperature for curing. Therefore, these are preferable from the point that heat deformation and color change of the substrate can be prevented more securely.

In the present embodiment, the component (A) can be produced by reacting the component (A1) and the component (A2). The reaction (reaction between the isocyanate group and the hydroxyl group) can be carried out by a known method. Further, by changing a molar ratio of the isocyanate group of the component (A1) and a molar ratio of the hydroxyl group of the component (A2), the component (A) having the reactive group at the terminal end can be produced. That is, in case the molar ratio of the isocyanate group of the component (A1) is larger than the molar ratio of the hydroxyl group of the component (A2), the component (A) having the isocyanate group (reactive group) at the terminal end can be obtained. On the other hand, in case the molar ratio of the hydroxyl group of the component (A2) is larger than the molar ratio of the isocyanate group of the component (A1), the component (A) having the hydroxyl group at the terminal end can be obtained.

<Property of Component (A)>

In the present embodiment, a mass of the reactive group of the component (A) is preferably within the range of 0.02 to 0.2 g per 1 g of the component (A). As the mass of the reactive group satisfies the above range, the coating can attain suitable curing rate; the adhesion between the substrate and other layer can be improved; and the appearance of the obtained multilayer body, particularly the multilayer body having other layer on the primer layer, can be improved. In order to further enhance these effects, the mass of the reactive group is preferably 0.03 to 0.1 g per 1 g of the component (A), and more preferably 0.04 to 0.1 g.

Also, a mol percentage of the reactive group of the component (A) is preferably 0.01 to 0.7 mol %, more preferably 0.02 to 0.3 mol %, and particularly preferably 0.04 to 0.25 mol %. Here, the mol percentage of the reactive group is calculated as described in following. First, a number of mols of the reactive group in the component (A) having specific mass is determined by chemical quantification, then the obtained number of mols of the reactive group is divided by a number of mols of urethane prepolymer included in the component (A) having specific mass, thereby a number of mols of the reactive group existing in one molecule of urethane prepolymer is obtained. Further, the obtained number of mols is divided by a number average molecular weight of the urethane prepolymer and the obtained value is represented by %, thereby the mol percentage of the reactive group in the component (A) is calculated. Note that, the number of mols of the urethane prepolymer is obtained by dividing the mass of the component (A) with the number average molecular weight of the urethane prepolymer.

Note that, in order to measure the mass of the reactive group, when the isocyanate group exist at the terminal end, then it may be quantified by a back titration using amine. That is, the isocyanate group in the component (A) is reacted with amine of a known amount, and the remaining amount of amine is titrated with acid for quantification, then the isocyanate group amount can be quantified by calculating the amount of amine which reacted. On the other hand, when the hydroxyl group exist at the terminal end, it may be quantified by titrating a reaction solution of an acylating agent with alkaline aqueous solution. That is, the hydroxyl group in the component (A) is reacted with acid anhydride of a known amount, and the remaining acid anhydride is hydrolyzed by water, then acetic acid formed is titrated with sodium hydroxide standard solution. Then, the amount of reacted acid anhydride is calculated to quantify the amount of the hydroxyl group.

In the present invention, the component (A) preferably has a weight molecular average molecular weight of 3,000 to 300,000 so that the primer composition for optical article has a relatively fast curing rate, a viscosity of the primer composition for optical article is easy for coating, and also to attain a smooth primer layer with sufficient thickness. Here, the number average molecular weight of the component (A) is preferably 1,000 to 25,000. The primer composition for optical article of the present invention includes the light-absorbing compound (B) (the component (B)) described in below, thus it is preferable to use the component (A) having the weight average molecular weight of above range. In some case, the component (B) may cause bleeding in the primer layer and it may lower the adhesion of the hard coat layer; however, these problems tend to be easily solved by using the component (A) satisfying the weight average molecular weight of above range. In order to further exhibit the above effects in the primer layer, the weight average molecular weight of the component (A) is more preferably 5,000 to 300,000, and even more preferably 10,000 to 200,000. Here, the number average molecular weight of the component (A) is more preferably 1,500 to 25,000, and even more preferably 2,000 to 23,000. For particularly preferable embodiment, the weight average molecular weight of the component (A) is 12,000 to 150,000, for even more preferable embodiment, it is 15,000 to 100,000, and for most preferable embodiment, it is 15,000 to 80,0000. Here, the number average molecular weight of the component (A) is 2,200 to 23,000; even more preferably 2,500 to 21,000; and most preferably 6,000 to 20,000.

Also, even in case of producing the primer layer by further increasing the molecular weight of the component (A) using moisture in air or using a curing agent which is described in below, the weight average molecular weight of the component (A) before increasing the molecular weight is preferably 3,000 to 300,000. Here, the number average molecular weight of the component (A) is preferably 1,000 to 25,000. Particularly, in case of stacking other layer (such as the hard coat layer) on the primer layer, a solubility resistance against the solvent increases, thus the multilayer body having even better appearance can be formed. Note that, the weight average molecular weight of the component (A) is a value obtained by a method described in the following examples (Gel Permeation Chromatography (GPC)).

In the present invention, the weight average molecular weight of the component (A) can be regulated by regulating the molecular weight, type, and the like of the component (A1) and the component (A2) being used. Also, in order to easily attain the weight average molecular weight of the component (A) within 3,000 to 300,000 and the number average molecular weight of the component (A) within 1,000 to 25,000, the following method of production is preferable. That is, a method of producing the component (A) preferably uses the chain extender (hereinafter, it may be referred as the component (A3)).

<Constituting Component "Chain Extender (A3)">

The chain extender is used as described in following. First, the component (A1) and the component (A2) are blended and reacted so that a molar ratio of either one of the reactive group (isocyanate group or hydroxyl group) is in excess, thereby a first urethane prepolymer having either one of the reactive group is prepared. Next, Using the component (A3) having plurality of reactive groups in the molecule which can react with the reactive group at the terminal end of the first urethane prepolymer, the first urethane prepolymer and the component (A3) are reacted to obtain the high molecular weight second urethane prepolymer. Note that, the type and amount of the component (A3) is regulated so that the reactive group at the terminal end of the second urethane prepolymer are the same as the reactive group of the first urethane prepolymer. That is, the type and the amount of the chain extender are regulated so that part of the reactive group of the first urethane prepolymer is left.

The first urethane prepolymer and the second urethane prepolymer can be used as the component (A) of the present invention. In case of using the first urethane prepolymer as the component (A), a mass of the reactive group of the first urethane prepolymer is preferably 0.02 to 0.2 g per 1 g of the first urethane prepolymer. A mol percentage of the reactive group in the first urethane prepolymer is preferably 0.01 to 0.7 mol % and the weight average molecular weight of the first urethane prepolymer is preferably 3,000 to 300,000. On the other hand, when the second urethane prepolymer is used as the component (A), the type and the amount of the component (A3) are regulated so that, a mass of the reactive group of the second urethane prepolymer is preferably 0.02 to 0.2 g per 1 g of the second urethane prepolymer, a mol percentage of the reactive group in the second urethane prepolymer is preferably 0.01 to 0.7 mol % and the weight average molecular weight of the second urethane prepolymer is preferably 3,000 to 300,000, and number average molecular weight of the component (A) is 1,000 to 25,0000.

In case the reactive group of the first urethane prepolymer (component (A)) is isocyanate group, the component (A3) uses a compound having plurality of groups (for example, hydroxyl group and/or amino group) in the molecule capable of reacting with the isocyanate group (hereinafter, it may be referred as the component (A3')).

As the compound having the hydroxyl group as the component (A3'), the component (A2) may be mentioned. The component (A3') may be a single type of compound or it may be a plurality of types of compounds. Among these, alkylene glycols such as 1,3-butanediol, 1,4-butanediol, propylene glycol, 1,6-hexanediol; and polypropylene glycols such as polypropylene glycol; and the like are suitable since it is easy to control a chain extension reaction (easy to control to attain higher molecular weight).

Also, as the component (A3'), a compound having plurality of amino groups in the molecule can be used. Specifically, a diamine compound and a triamine compound can be used. The component (A3') having amino group may be a single type of compound or plurality of types of compounds. As specific examples, 3,3'-dichloro-4,4'-diaminodiphenylmethane, methylenedianiline, sodium chloride complex of methylenedianiline, isophoronediamine, bis-(4-aminocyclohexyl) methane, and norbornanediamine are preferable; and among these, 3,3'-dichloro-4,4'-diaminodiphenylmethane and bis-(4-aminocyclohexyl) methane may be mentioned.

On the other hand, in case the reactive group at the terminal end of the first urethane prepolymer (component (A)) is hydroxyl group, the component (A3) uses a compound having plurality of isocyanate groups in the molecule (hereinafter, it may be referred as the component (A3")). The component (A3") may be a single type of compound or it may be a plurality of types of compounds. As specific examples of the component (A1), aliphatic isocyanate compounds, polyisocyanate compounds, and the like may be mentioned. As the polyisocyanate compounds, trimethylolpropane adduct of aliphatic isocyanate compound and aromatic isocyante compound of the component (A1), isocyanulates, and the like may be mentioned. Among these, the component (A1) or trimethylolpropane adduct thereof is suitable since the obtained second urethane prepolymer has higher hardness and dries faster.

As discussed in above, the component (A) (first and second urethane prepolymer) can be categorized into two groups depending on the difference of the reactive group at the terminal end. That is, it can be categorized into the urethane prepolymer having isocyanate group at the terminal end (hereinafter it may referred as a component (A') or a terminal end isocyanate type urethane prepolymer) and into the urethane prepolymer having hydroxyl group at the terminal end (hereinafter it may be referred as a component (A") or a terminal end hydroxyl group type urethane prepolymer). The primer composition for optical article including the component (A') or the component (A") has different method of forming the primer layer (a method of curing). Difference of these urethane prepolymers is described in below.

<Type of Component (A) Depending on Difference of Curing Method (Method of Forming a Coating)>
<Urethane Prepolymer (A') Having Isocyanate Group at Terminal End>

As the primer composition for optical article including the component (A'), there are two different methods of forming the primer layer (methods of curing). One is a moisture curing type primer which cures by water (moisture) in air and another is a two liquids type primer which cures using a curing agent (E') (hereinafter, it may be referred as a component (E')) having plurality of groups capable of reacting with isocyanate group in the molecule. These are described in below.

<Moisture Curing Type Primer Including Component (A')>

The component (A') (terminal end isocyanate type urethane prepolymer) is a reaction product between an aromatic polyisocyanate compound (component (A1)) and a polyol compound (component (A2)). If necessary, those having a high molecular weight can be used by using the component (A3').

The terminal end isocyanate type urethane prepolymer is regulated to have isocyanate group at the terminal end of the molecule according to the above mentioned method; and a mass of the isocyanate group is preferably 0.02 to 0.2 g per 1 g of urethane prepolymer. A mol percentage of isocyanate group in the urethane prepolymer is preferably 0.01 to 0.7 mol %, a weight average molecular weight of the urethane prepolymer is preferably 3,000 to 300,000, and a number average molecular weight of the component (A) is preferably 1,000 to 25,000.

In case of using the terminal end isocyanate type urethane prepolymer, the method of curing the primer composition for optical article of the present invention (the method of forming the primer layer) is as described in below. That is, the primer composition for optical article of the present invention is coated on the substrate to form a coating, then the terminal end isocyanate type urethane prepolymer is reacted (polymerized) by moisture in air, thereby the primer layer is formed. According to this method, the primer layer can be formed without increasing to a high temperature. Therefore, it is suitable to apply to the substrate having different thickness at a center part and an end part such as a glass lens substrate and the like. Also, it can be cured (form the primer layer) relatively uniformly, hence the component (B) in the primer layer can be dispersed in further better condition.

Since the primer layer is formed by such method, in case of using the terminal end isocyanate type urethane prepolymer, it is preferable to use the terminal end isocyanate urethane prepolymer having certain level of molecular weight in order to have better appearance of the obtained multilayer body and to further enhance the adhesion. That is, in case of using the terminal end isocyanate type urethane prepolymer, a mass of the isocyanate group and a weight average molecular weight of the isocyanate group is particularly preferably within the following range in order to have an appropriate curing rate of the coating, to further enhance adhesion between the substrate and other layer, and to further improve the appearance of the obtained multilayer body, particularly the multilayer body having other layer on the primer layer. In order to sufficiently exhibit such effects, the mass of the isocyanate group of the terminal end isocyanate type urethane prepolymer is more preferably 0.03 to 0.1 g, even more preferably 0.04 to 0.1 g, and particularly preferably 0.04 to 0.08 g per 1 g of the urethane prepolymer. A mol percentage of isocyanate group in the urethane prepolymer is preferably 0.01 to 0.7 mol %, more preferably 0.02 to 0.3 mol %, and 0.04 to 0.25 mol %. Also, the weight average molecular weight of the urethane prepolymer is preferably 5,000 to 300,000, more preferably 10,000 to 200,000, even more preferably 15,000 to 100,000, and particularly preferably 15,000 to 80,000. Here, the number average molecular weight of the component (A) is preferably 1,500 to 25,000, more preferably 2,200 to 23,000, even more preferably 2,500 to 21,000, and particularly preferably 6,000 to 20,000. In the present invention, the curing property of the terminal end isocyanate type urethane prepolymer is particularly preferable for forming the primer layer of the glass lens substrate.

<Two Liquid Type Primer Including Component (A') and Curing Agent (E')>

In case of using the terminal end isocyanate type urethane prepolymer, right before forming a coating on the substrate, the curing agent (hereinafter, it may be referred as the component (E')) including plurality of groups capable of reacting with isocyanate group in the molecule is preferably mixed in the primer composition for optical article. Note that, this terminal isocyanate group type urethane prepolymer also preferably has a mass of the isocyanate group within 0.02 to 0.2 g per 1 g of the urethane prepolymer; and a mol percentage of isocyanate group in the urethane prepolymer is preferably 0.01 to 0.7 mol %. Also, the weight average molecular weight of the urethane prepolymer is preferably 3,000 to 300,000, and a number average molecular weight of the urethane prepolymer is 1,000 to 25,000. By using the component (E'), the primer layer can be formed more firmly in short period of time.

Among these, in case the cured body made of the component (E') and the terminal end isocyanate type urethane prepolymer forms the primer layer, in order to exhibit further improved effects, a mass of the isocyanate group of the terminal end isocyanate type urethane prepolymer is more preferably 0.03 to 0.1 g and even more preferably 0.04 to 0.1 g per 1 g of the urethane prepolymer. The mol percentage of the isocyanate group in the urethane prepolymer is preferably 0.01 to 0.7 mol %, more preferably 0.02 to 0.3 mol %, and particularly preferably 0.04 to 0.25 mol %. The weight average molecular weight of the urethane prepolymer is preferably 5,000 to 300,000, more preferably 10,000 to 200,000, even more preferably 15,000 to 100,000, and particularly preferably 15,000 to 80,000. Here, the number average molecular weight of the urethane prepolymer is preferably 1,500 to 25,000, more preferably 2,200 to 23,000, even more preferably 2,500 to 21,000, and particularly preferably 6,000 to 20,000.

As the component (E'), those same as the component (A3') may be mentioned. As particularly preferable examples, 1,3-butanediol, 1,4-butanediol, propylene glycol, 1,6-hexanediol, 3,3'-dichloro-4,4'-diaminodiphenylmethane, bis-(4-aminocyclohexyl) methane, and the like may be mentioned.

In case of using the component (E'), the preferable amount of use is adjusted so that the number of isocyanate groups in the terminal end isocyanate type urethane prepolymer and the number of reactive groups in the component (E') are the same. In case of mixing, those diluted with solvent having a solubility parameter of 8 or more, which is described in below, can be used.

<Two Liquid Type Primer Including Component (A") and Curing Agent (E)>

In case of using the component (A") (terminal end hydroxyl group type urethane prepolymer), right before forming the coating on the substrate, the curing agent having plurality of isocyanate groups in the molecule is preferably mixed in the primer composition for optical article. Note that, a mass of hydroxyl group for the terminal end hydroxyl group type urethane prepolymer is preferably 0.02 to 0.2 g per 1 g of the urethane prepolymer. A mol percentage of hydroxyl group in the urethane polymer is preferably 0.01 to 0.7 mol % and a weight average molecular weight of the urethane prepolymer is preferably 3,000 to 300,000. A number average molecular weight of the urethane prepolymer is preferably 1,000 to 25,000. By using the component (E), the primer layer can be formed more firmly in short period of time.

Among these, in case the primer layer is formed by the cured body constituted from the component (E) and the terminal end hydroxyl group type urethane prepolymer, in order to exhibit even more excellent effects, the mass of the hydroxyl group of the terminal end hydroxyl group type urethane prepolymer is 0.03 to 0.1 g and more preferably 0.04 to 0.1 g per 1 g of the urethan prepolymer. The mol percentage of the hydroxyl group in the urethane prepolymer is preferably 0.01 to 0.7 mol %, more preferably 0.02 to 0.3 mol %, and particularly preferably 0.04 to 0.25 mol %. The weight average molecular weight of the urethane prepolymer is preferably 5,000 to 300,000, more preferably 10,000 to 200,000, even more preferably 15,000 to 100,000, and particularly preferably 15,000 to 80,000. Here, the number average molecular weight of the urethane prepolymer is 1,500 to 25,000, more preferably 2,200 to 23,000, even more preferably 2,500 to 21,000, and particularly preferably 6,000 to 20,000.

As the component (E), along with aromatic polyisocyanate compounds described as examples of the component (A1), aliphatic polyisocyanate compounds such as hexamethylene diisocyanate, isophorone diisocyanate, xylylene diisocyanate, and the like; trimethylolpropane adduct of the polyisocyanate compound or isocyanurate; and the like may be mentioned.

In case the component (E) is used, the preferable amount of use is adjusted so that the number of hydroxyl groups in the terminal end hydroxyl group type urethane prepolymer and the number of isocyanate groups in the component (E) are the same. In case of mixing, those diluted with solvent having a solubility parameter of 8 or more, which is described in below, can be used.

<Light-Absorbing Compound (B) (Hereinafter, it May be Referred as the Component (B))>

In the present embodiment, the light-absorbing compound has a local maximum light-absorption wavelength of 320 nm or more and 650 nm or less, and known compounds can be used. For example, it may be a component (B1) having a local maximum light-absorption wavelength of more than 400 nm and 450 nm or less (hereinafter it may be referred as the component (B1)), it may also be an ultraviolet absorbing agent (B2) (hereinafter, it may be referred as the component (B2)) having a local maximum light-absorption wavelength of 320 nm or more 400 nm or less, and it may be a dye (hereinafter, it may be referred as the component (B3)) having a local maximum light-absorption wavelength of 540 to 650 nm or less. Here, the component (B3) preferably has the local maximum light-absorption wavelength of 540 to 620 nm.

These light-absorbing compounds can be combined in anyway and used. For example, in case of focusing on the ultraviolet absorbing property, the component (B2) is used; in case of focusing on the blue light absorbing property, the component (B1) is used; and in case of focusing on antiglare property, the component (B3) is used. Therefore, in case of providing both the ultraviolet absorbing property and the blue light absorbing property, the component (B1) and the component (B2) may both be included. In such case, as the component (B), the light-absorbing compound having the local maximum light-absorption wavelength of 320 nm or more and 450 nm or less is used as the component (B). Choices and combinations of the components (B1) to (B3) may be determined accordingly depending on the purpose of use, the used optical substrate, the hard coat layer, and the like.

A blending amount of the light-absorbing compound (B) is not particularly limited, and it may be determined depending on the purpose of use and the like. Among these, it is preferably 0.01 to 20 parts by mass per 100 parts by mass of the component (A). By satisfying the above range, high ultraviolet blocking property, blue light property, or anti-glare property can be provided without decreasing strength of the coating formed by curing the primer composition. Therefore, the blending amount of the component (B) is more preferably 0.02 to 20 parts by mass per 100 parts by mass of the component (A). Note that, for the blending amount of the component (B), in case the component (B) is used by mixing several types of these, then it is the total amount thereof. For example, in case of using plurality of components (B1), plurality of components (B2), and plurality of components (B3); or in case of using by combining the components (B1) to (B3) in arbitrary combination, then a total amount of each component is used as standard. Also, in case of the two liquid type primer, a mass of the component (E) and the component (E') are not included in the mass of the component (A).

Next, the component (B1) is described.

<Component (B1); Component Having a Local Maximum Light-Absorption Wavelength of More than 400 nm and 450 nm or Less>

The component (B1) used in the present invention is not particularly limited and commercially available compounds can be used as long as it is a compound having the local maximum light-absorption wavelength of more than 400 nm and 450 nm or less. Among these, in order to easily disperse in the primer composition for optical article and to maintain a high adhesion of the obtained primer layer, specifically, perylene based compounds, porphyrin compounds, carotenoid based compounds, cyanine based compounds, and the like can be mentioned.

As the carotenoid based compounds, carotenes can be used. Specifically, zeta-carotene can be used. Note that, zeta-carotene can be used by a known method.

As the cyanine based compounds, commercially available compounds can be used. For example, cyanine compounds and merocyanine compounds available from Tokyo Chemical Industry and the like can be used. Also, FDB-009 and the like; product name of YAMADA CHEMICAL CO., LTD can be used as well.

Among these components (B1), the porphyrin compounds are preferably used. Also, among the porphyrin compounds, porphyrin metal complex including metals such as copper, magnesium, zinc, cobalt, titanium, tin, iron, copper, vanadium, and the like as a center metal can be used. As the porphyrin metal complex, those commercially available ones can be used. Specifically, compounds available from Tokyo Chemical Industry and the like can be used, and FDB-001, FDB-002, and the like; product name of YAMADA CHEMICAL CO., LTD can be used as well. Also, a porphyrin compound shown by below formula (1) can be used.

[Chemical formula 1]

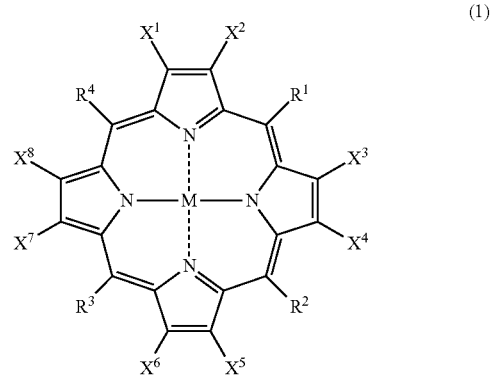

(1)

In the above chemical formula 1, $X^1$ to $X^8$ are selected from hydrogen atom; halogen atom; linear, branched, or cyclic alkyl group; linear, branched, or cyclic alkoxy group; substituted or unsubstituted ethenyl group; substituted or unsubstituted ethynyl group; substituted or unsubstituted aryl group; substituted or unsubstituted aryloxy group; substituted or unsubstituted aryloxycarbonyl group; substituted or unsubstituted alkyloxy group; substituted or unsubstituted arylthio group; substituted or unsubstituted aralkyl group; substituted or unsubstituted aralkyloxy group; linear, branched, or cyclic halgenoalkyl group; linear, branched, or cyclic halogenoalkoxy group; substituted or unsubstituted acyl group; linear, branched, or cyclic alkoxyalkyl group; linear, branched, or cyclic alkoxyalkoxyalkyl group; substituted or unsubstituted aryloxyalkyl group; substituted or unsubstituted aralklyloxyalkyl group; or linear, branched, or cyclic halogenoalkoxyalkyl group. Also, the reactive groups adjacent to each other selected from $X^1$ to $X^8$ may bind with each other and form substituted or unsubstituted aromatic ring together with substituted carbon atom.

$R^1$ to $R^4$ are substituted or unsubstituted aryl group respectively, and

M is two hydrogen atoms, two monovalent metal atoms, divalent metal atom, trivalent substitutional metal atom, tetravalent substitutional metal atom, or metal oxides.

Among these, in the present invention, in order to exhibit further enhanced effects, preferably $X^1$ to $X^8$ are respectively hydrogen atom; halogen atom; linear alkyl group having 1 to 10 carbon atoms; branched alkyl group having 3 to 10 carbon atoms; or cyclic alkyl group having 3 to 10 carbon atoms;

preferably $R^1$ to $R^4$ are respectively substituted or unsubstituted aryl group; and "M" is preferably copper, magnesium, zinc, cobalt, titanium, iron, vanadium, or vanadium oxide.

Also, as specific examples of porphyrin compounds, copper porphyrin complex, vanadium porphyrin complex, magnesium porphyrin complex, and zinc porphyrin complex may be mentioned. Among these, in order to form the primer layer having excellent property, it is preferable to use the porphyrin complex having the local maximum light-absorption wavelength of 405 nm or more and 440 nm or less, and more preferably the porphyrin complex having the local maximum light-absorption wavelength of 410 or more to 435 nm or less.

In the present invention, the component (B1) may be selected appropriately depending on the purpose of use. Here, a mixture of two or more compounds can be used. Among these, in order to have better handling and to exhibit the effects of the present invention more efficiently, a molar absorption coefficient of the component (B1) is preferably 50 to 2000 (L/(g·cm)). By satisfying this range, blue light can be absorbed efficiently without decreasing strength of the coating (primer layer) obtained by curing the primer composition for optical article. In order to enhance such effects, the molar absorption coefficient of the component (B1) is preferably 100 to 1000 (L/(g·cm)) and more preferably 150 to 1000 (L/(g·cm)). Among the component (B1), the molar absorption coefficient of the porphyrin compounds is preferably within the range that is 50 to 2000 (L/(g·cm)).

Also, in the present invention, the component (B1) may be selected appropriately depending on the purpose of use. In such case, Here, a mixture of two or more compounds can be used. Among these, in order to have better handling and to exhibit the effects of the present invention more efficiently, a full width half maximum of the local maximum light-absorption peak of the component (B1) is preferably 40 nm or less. By satisfying such range, blue light can be efficiently absorbed while maintaining low initial coloring (YI) of the coating (primer layer) obtained by curing the primer composition for optical article. Therefore, the added amount of a component (B3) described in below can be reduced, thus the primer layer having a high transparency (high luminous transmittance) can be obtained. In order to enhance such effect, the full width half maximum of the local maximum light-absorption peak of the component (B1) is preferably 35 nm or less and more preferably 30 nm or less. The narrower the full width half maximum is, the more suitable it is, since the light-absorbing property becomes more controllable, however considering the industrial production of the component (B1), it is 5 nm or more. Hence, the full width half maximum of the local maximum light-absorption peak of the component (B1) is preferably 5 nm or more and 40 nm or less, more preferably 5 nm or more and 35 nm or less, and even more preferably 5 nm or more and 30 nm or less.

The blended amount of the component (B1) is not particularly limited, and it may be determined appropriately depending on the purpose of use. The blending amount of the component (B1) is preferably 0.01 to 20 parts by mass per 100 parts by mass of the component (A). By satisfying this range, a high blue light blocking property can be provided without decreasing the strength of the coating formed by curing the primer composition. Therefore, in case of only using the component (B1), the blending amount of the component (B1) is more preferably 0.01 to 10 parts by mass, even more preferably 0.02 to 3 parts by mass, and particularly preferably 0.02 to 2 parts by mass per 100 parts by mass of the component (A). Note that, the blending amount of the component (B1) is an amount of the component (B1) alone, and in case the component (B) includes other components, such as the component (B2), the component (B3), and the like, an amount of these are not included. However, when plurality of types of the component (B1) is used, the blending amount of the component (B1) is a total of these. Also, in case of the two liquid type primer, the mass of the component (E) and component (E') (which is a mass of the curing agent) is not included in the mass of the component (A).

The component (B1) is a compound having the local maximum light-absorption wavelength of more than 400 nm and 450 nm or less, thus blue light can be absorbed by relatively small amount. Specifically, the multilayer body having a transmittance of 80% or less at wavelength of 420 nm can be produced by relatively small blending amount.

<Component (B2): Ultraviolet Absorbing Agent>

The ultraviolet absorbing agent (B2) (component (B2)) used in the present invention is not particularly limited, and preferably it efficiently absorbs ultraviolet rays and blue light of near ultraviolet range and has high durability. Further, the component (B2) having the local maximum light-absorption wavelength of 320 nm or more and 400 nm or less is preferable. As such ultraviolet absorbing agent, benzotriazole based compounds having structure (backbone) shown in below is preferable.

[Chemical formula 2]

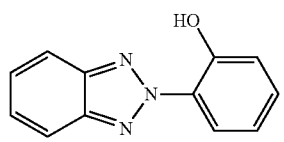

As such component (B2), those already known can be used. For example, ADK STAB LA series (LA-24, LA-29, LA-31, LA-32, LA-36, and the like) made by ADEKA Corporation; SEESORB series (701, 703, 704, 709, L58, L52, and the like) made by SHIPRO KASEI KAISHA LTD;

ChemiSorb series (KEMSORB 74, KEMSORB 79, KEMSORB 279, and the like) made by CHEMIPRO KASEI; and the like may be mentioned. These may be used alone or by mixing two or more thereof.

In the present invention, the blending amount of the component (B2) is not particularly limited and preferably it is 0.01 to 20 parts by mass per 100 parts by mass of the component (A). The preferable blending amount is as described in below to have a higher ultraviolet blocking property without decreasing strength of the coating formed by curing the primer composition. Specifically, particularly in case of only using the component (B2), the blending amount of the component (B2) is more preferably 0.1 to 20 parts by mass, more preferably 0.5 to 20 parts by mass, and particularly preferably 1 to 18 parts by mass per 100 parts by mass of the component (A). Note that, the blending amount of the component (B2) is an amount of the component (B2) alone, and in case the component (B) includes other components, such as the component (B1), the component (B3), and the like, the amount of these are not included. However, when a plurality of types of the component (B2) is used, the blending amount of the component (B2) is a total of these. Also, in case of the two liquid type primer, the mass of the component (E) and the component (E') (that is, the mass of the curing agent) is not included in the mass of the component (A).

By using the component (B2), ultraviolet ray can be absorbed efficiently. Specifically, the multilayer body having a transmittance of 80% or less at wavelength of 420 nm and a transmittance of 5% or less at wavelength of 400 nm can be produced easily.

In general, full width half maximum of the local maximum light-absorption peak of the component (B2) becomes wider. Usually, the full width half maximum is within the range of 50 to 150 nm. Since the component (B2) having such full width half maximum is used, when it is blended with other components, it is preferable to use with a component having a narrow full width half maximum. An extinction coefficient of the component (B2) is preferably within the range of 10 to 200 (L/(g·cm)).

<In Case of Using Component (B1) and Component (B2) Together>

In a particularly preferable embodiment of the present invention, the component (B1) and the component (B2) are used together. By using the component (B1) and the component (B2) together, the primer layer capable of efficiently absorbing ultraviolet ray and blue light which are bad for human eyes can be formed.

When the component (B1) and the component (B2) are used together, a ratio of each is not particularly limited, and in order to form the primer layer absorbing ultraviolet ray and blue light in more efficient blending amount, the blending amount of the component (B1) is preferably 0.1 to 20 parts by mass, more preferably 0.2 to 15 parts by mass, and further preferably 0.5 to 10 parts by mass when the blending amount of the component (B2) is 100 parts by mass.

Also, when the component (B1) and the component (B2) are used together, a total amount of the component (B1) and the component (B2) is similar to the blending amount of the component (B), that is, it is preferably 0.01 to 20 parts by mass and more preferably 0.02 to 20 parts by mass per 100 parts by mass of the component (A). Particularly, considering a dispersibility in the primer composition for optical article, an absorbance of ultraviolet ray and blue light in more efficient amount, and an adhesion of the obtained primer layer, the total amount of the component (B1) and the component (B2) is preferably 0.1 parts by mass or more and 15 parts by mass or less, more preferably 0.5 parts by mass or more and 12 parts by mass or less, and even more preferably 1 parts by mass or more and 12 parts by mass or less per 100 parts by mass of the component (A). By using together, lights which are bad for human eyes can be absorbed more efficiently than in case of using alone. Therefore, when using together, the obtained multilayer body can easily have a transmittance of 80% or less at wavelength of 420 nm. Further, the multilayer body can easily have a transmittance of 5% or less at wavelength of 400 nm. Therefore, in case of using the component (B1) and the component (B2) together, it is obvious that the obtained multilayer body can effectively absorb ultraviolet ray and blue light.

Note that, not to mention, even when the component (B1) and the component (B2) are used together, the preferable component (B1) and the preferable component (B2) are the same as mentioned in above.

<Component (B3): Dye Having Local Maximum Light-Absorption Wavelength of 540 to 650 nm>

The primer composition for optical article of the present invention absorbs ultraviolet ray and blue right of near ultraviolet range when it includes the component (B1) and the component (B2). Therefore, due to the component (B1) and the component (B2), it may be colored in yellow. In order to reduce this coloring, a component (B3) is preferably blended. Note that, in case the lens substrate itself is yellow, a primer composition for optical article including only the component (B3) as the light-absorbing compound may be used.

This component (B3) can be categorized into two components depending on effects. That is, a component (B31) capable of regulating a color tone; and a component (B32) capable of regulating a color tone and providing an anti-glare property.

<Component (B31)>

As the component (B31), specifically, phthalocyanine based compounds, anthraquinone based compounds, indigo based compounds, and the like may be mentioned. Such component (B31) can regulate a color tone as a bluing agent. As such component (B31), those commercially available ones can be used. For example, purple and blue dyes made by Mitsubishi Chemical Corporation (product name: Diaresin) or Nippon Kayaku Co., Ltd. (product name: Kayaset) can be used. Specifically, product name: Diaresin Blue J, Diarein Violet D, Diaresin Violet RR, Diaresin Blue K, Kayaset Blue FR, and the like may be mentioned.

In the present embodiment, the component (B31) may be selected appropriately depending on purpose of use. Here, a mixture of two or more compounds may be used. In order to have better handling and to exhibit the effects of the present invention more efficiently, an extinction coefficient of the component (B31) is preferably 10 to 200 (L/(g·cm)). Also, full width half maximum of the local maximum light-absorption peak of the component (B31) becomes wider. Usually, the full width half maximum is within the range of 50 to 150 nm.

In the present invention, the blending amount of the component (B31) is not particularly limited; and it is preferably 0.001 to 1 parts by mass and more preferably 0.01 to 0.5 parts by mass per 100 parts by mass of the component (A). In order to reduce the coloring of primer layer, primary multilayer body, and secondary multilayer body, preferably 0.005 to 10 parts by mass and 0.05 to 5 parts by mass of the component (B31) is blended when a total amount of the component (B1) and the component (B2) is 100 parts by mass. Note that, in case of using a plurality of types of the component (B31), the above mentioned blended amount is a total amount of the plurality of types of the component (B31). Also, in case of the two liquid type primer, the mass of the component (E) and the component (E') (that is, the mass of the curing agent) is not included in the mass of the component (A).

<Component (B32)>

Among dyes having the local maximum light-absorption wavelength 540 to 650 nm, there are compounds which provides a bluing property and an anti-glare property (component (B32)). By blending such component (B32), glare caused by sun light, head lights of automobiles, and the like; and also discomfort, unclear contrast, visual fatigue, and the like related to the glare can be reduced. As the component (B32) used for the above object, specifically, tetraazaporphyrin compounds, neodymium compounds, and the like may be mentioned.

As the neodymium compounds, neodymium phosphate, neodymium carbonate, neodymium sulfate, neodymium acetate, neodymium nitrate, neodymium oxide, and the like may be mentioned.

Among these compounds, tetraazaporphyrin compounds are particularly preferably used. The commercially available tetraazaporphyrin compound can be used. For example, the porphoryn compounds available from Tokyo Kasei Industry; and product name: FDG-005, FDG-006, FDG-007, FDR-001, and the like made by YAMADA CHEMICAL CO., LTD can be used. Also, product name: PD-320 and the like made by Yamamoto Chemicals Inc. can be used. Further, as tetraazaporphyrin, a compound shown in below formula (2) can be used.

[Chemical formula 3]

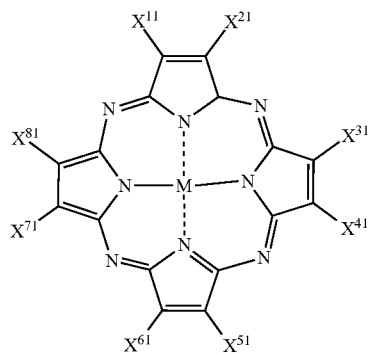

(2)

In the above formula (2), $X^{11}$ to $X^{81}$ are each independently, hydrogen atom; halogen atom; nitro group; cyano group; hydroxyl group; amino group; carboxyl group; sulfonate group; linear, branched, or cyclic alkyl group having 1 to 20 carbon atoms; linear, branched, or cyclic alkoxy group having 1 to 20 carbon atoms; aryloxy group having 6 to 20 carbon atoms; monoalkylamino group having 1 to 20 carbon atoms; dialkylamino group having 2 to 20 carbon atoms; dialkylamino group having 7 to 20 carbon atoms; aralkyl group having 7 to 20 carbon atoms; aryl group having 6 to 20 carbon atoms; heteroaryl group; alkylthio group having 6 to 20 carbon atoms; and arylthio group having 6 to 20 carbon atoms; furthermore, a ring excluding aromatic ring can be formed via connecting group. "M" represents two hydrogen atoms, divalent metal atom, divalent monosubstitutional metal atom, trivalent substitutional metal atom, tetravalent substitutional metal atom, or metal oxides.

Among these, in order to form the primer layer having an excellent anti-glare property, the above mentioned tetraazaporphyrin compounds having the local maximum light-absorption wavelength of 560 nm or more and 620 nm or less is preferably used, and more preferably the tetraazaporphyrin compounds having the local maximum light-absorption wavelength of 580 nm or more and 610 nm or less is used.

In the present invention, the component (B32) may be selected accordingly depending on the purpose of use. Here, mixture of two or more compounds can be used. An extinction coefficient of the component (B32) is preferably within the range of 10 to 1000 (L/(g·cm)) in order to have good handling and to exhibit the effects efficiently. By satisfying this range, an excellent anti-glare property can be attained without decreasing strength of the obtained coating (primer layer) formed by curing the primer composition for optical article. In order to enhance such effect, the extinction coefficient of the compound (B32) is more preferably 25 to 800 (L/(g·cm)), and more preferably 50 to 500 (L/(g·cm)).

Also, in order to further exhibit the anti-glare effect, the full width half maximum of the local maximum light-absorption peak of the component (B32) is preferably 40 nm or less. By satisfying such range, the anti-glare property of the coating (primer layer) obtained by curing the primer composition of optical article can be exhibited. That is, glare caused by sun light, head lights of automobiles, and the like; and also discomfort, unclear contrast, visual fatigue, and the like related to the glare can be reduced. In order to further enhance such effect, the full width half maximum of the local maximum light-absorption peak of the component (B32) is more preferably 35 nm or less and even more preferably 30 nm or less. The narrower the full width half maximum is, the more preferable it is, since it is more controllable; however, considering the industrial production of the component (B32), it is 5 nm or more. Hence, the full width half maximum of the local maximum light-absorption peak of the component (B32) is preferably 5 nm or more and 40 nm or less, more preferably 5 nm or more and 35 nm or less, and even more preferably 5 nm or more and 30 nm or less.

The blending amount of the component (B32) is not particularly limited and it may be determined accordingly depending on the purpose of use. The blending amount of the component (B32) is preferably 0.01 to 2 parts by mass per 100 parts by mass of the component (A). By satisfying this range, a high anti-glare property can be provided without decreasing the strength of the coating formed by curing the primer composition. Therefore, the blending amount of the component (B32) is more preferably 0.01 to 1 part by mass and even more preferably 0.02 to 0.8 parts by mass per 100 parts by mass of the component (A). Note that, in case of using a plurality of types of the component (B32), the above mentioned blended amount is a total amount of the plurality of types of the component (B32). Also, in case of the two liquid type primer, the mass of the component (E) and the component (E') (that is, the mass of the curing agent) is not included in the mass of the component (A).

<Organic Solvent (C) Having Solubility Parameter of 8 [$(Cal/Cm^3)^{1/2}$] or More and does not have Active Hydrogen>

The organic solvent (hereinafter, it may be referred as a component (C)) used in the present invention has a solubility parameter of 8 [$(cal/cm^3)^{1/2}$] or more. Here, the solubility parameter is a value which may be also called Hildebrand parameter or SP value. In the present specification, the solubility parameter is based on the description of "The Three Dimensional Solubility Parameter And Solvent Diffusion Coefficient" by Charles M. Hansen, Copenhagen Danish Technical Press 1967. The organic solvent used in the present invention does not have active hydrogen and the solubility parameter is 8 or more, preferably 8.5 or more, and more preferably 8.9 or more. The solubility parameter is preferably 11 or less, more preferably 10.5 or less, and even more preferably 10.0 or less. Specifically, toluene (8.9), ethyl acetate (9.1), xylene (8.8), acetone (9.8), tetrahydrofuran (9.5), dichloromethane (9.9), chloroform (9.2), methyl ethyl ketone (9.3), methyl isobutyl ketone (8.6), and the like may be mentioned as the organic solvent. Note that, numbers shown in the brackets represent the solubility parameter. These can be used alone or by mixing two or more thereof. Among these, considering the solubility of the component (B), toluene, ethyl acetate, tetrahydrofuran, dichloromethane, and chloroform are particularly preferable since the primer composition for optical article of the present invention includes the component (B).

In the present invention, the blending amount of the component (C) is not particularly limited, and preferably it is 100 to 200 parts by mass per 100 parts by mass of the component (A). By satisfying this range, it becomes easy to regulate a viscosity for obtaining a desired thickness of the coating after being coated. In the present invention, in order to uniformly disperse the component (A) and the component (B) and also to obtain a smooth coating, the blending amount of the component (C) is more preferably 100 to 1000 parts by mass per 100 parts by mass of the component (A). Note that, in case of the two liquid type primer, the mass of the component (E) and the component (E') (that is, the mass of the curing agent) is not included in the mass of the component (A). Note that, in case the component (E') and the component (E) are diluted by the component (C), this component (C) used for the dilution is included in the blending amount of the component (C).

The primer composition for optical article of the present invention includes the above mentioned component (A), component (B), and component (C) as essential components, and further includes the component (E') and the component (E) if needed which are the curing agent. Further, the primer composition for optical article of the present invention further preferably includes following additive components.

<Leveling Agent (D)>

The primer composition for optical article of the present invention preferably includes a leveling agent (hereinafter, it may be referred as the component (D)) in order to improve the smoothness of the obtained primer layer. As the component (D), a surfactant may be mentioned. As the surfactant, known surfactants may be used without any limitation. For example, silicone surfactants, fluorine-containing surfactants, and the like can be mentioned. As specific example of silicone surfactants and fluorine-containing surfactants, "L-7001", "L-7002", "L-7604", "FZ-2123", and "FZ2104" made by Dow Corning Toray Co., Ltd.; "MEGAFACE F-470", "MEGAFACE F-1405", and "MEGAFACE F-479" made by DIC CORPORATION; "Florade FC-430" made by SUMITOMO 3M LTD.; and the like can be mentioned. When the surfactant is used, two or more may be mixed for use.

In the present invention, the blending amount of the component (D) is not particularly limited and it is preferably 0.001 to 1 part by mass and more preferably 0.01 to 0.5 parts by mass per 100 parts by mass of the component (A).

<Other Additives>

The primer composition for optical article of the present invention can include known additives besides the above mentioned components within the range which does not interfere the effect of the present invention.

For example, a stabilizer such as hindered amine light stabilizer, hindered phenol antioxidant, phenol based radical scavenger, sulfur based antioxidant, and the like may be mentioned. The added amount of such stabilizer is preferably 0.01 to 10 parts by mass and more preferably 0.1 to 5 parts by mass per 100 parts by mass of the component (A).

Also, in order to efficiently block blue light having longer wavelength than ultraviolet ray, a yellow pigment and the like can be blended.

As the yellow pigment, a known pigment can be used, and for example, Color Index Generic Name of Pigment Yellow 12, 13, 14, 17, 65, 81, 83, 93, 120, 128, 155, 180, and the like can be mentioned. An added amount of such pigment is preferably 0.001 to 1 part by mass and more preferably 0.005 to 0.1 parts by mass per 100 parts by mass of the component (A). Next, the substrate is described.

<Optical Substrate>

The primer composition for optical article of the present invention is coated on the surface of the optical article. As the substrate, a plastic lens substrate may be mentioned. For example, thermoplastic resin lens such as (meth)acrylic resin, polycarbonate resin, and the like; crosslinkable resin lens such as polyfunctional (meth)acrylic resin, allyl resin, thiourethane resin, urethane resin, thioepoxy resin, and the like may be mentioned which are currently used as known plastic lenses. Also, a thickness of the optical substrate is not particularly limited, and it is preferably within the range of 0.5 to 10 mm. In case of the plastic lens substrate, the thickness of the end part and the center part are both within the range of 0.5 to 10 mm and when a ratio of the thickness of the end part and the center part (center part/end part) is 0.1 to 10, then it is suitably used for the primer composition for optical article of the present invention. Note that, in case of the plastic lens substrate, the primer layer can be formed on the substrate thicker than the above mentioned range then it can be polished to have the thickness mentioned in above.

A plastic lens usually has different thickness at a center part and an end part; hence the ultraviolet absorbing property differs depending on the thickness. Therefore, when the ultraviolet absorbing agent is only blended to the plastic lens substrate, the ultraviolet absorbing property differs at the center part and the end part. According to the present invention, such problem can be solved. Note that, as the plastic lens substrate, those blended with the ultraviolet absorbing agent in an amount which does not interfere the effects of the present invention can be used for the purpose of preventing the lens substrate from deteriorating and to block ultraviolet ray.

In the present invention, when forming the primer layer from the primer composition for optical article of the present invention on the optical substrate, the optical substrate is preferably subjected to a known pre-treatment in order to improve the adhesion with the primer layer. As the pre-treatment, a degreasing treatment by an organic solvent, a chemical treatment by basic aqueous solution or acidic aqueous solution, a polishing treatment using a polisher, a plasma treatment using an atmospheric plasma or low-pressure plasma, a corona discharge treatment, a flame treatment, UV ozone treatment, and the like can be mentioned. Among these, from the point of improving the adhesion between the optical substrate and the primer layer, the primer layer is preferably formed on the optical substrate performed with a degreasing treatment by an organic solvent, an alkaline treatment, a polishing treatment, a plasma treatment, a corona discharge treatment, UV ozone treatment, or combination of these.

<Method of Forming Primer Layer on Optical Substrate (Method of Forming Primary Multilayer Body)>

The primer composition for optical article of the present invention including the component (A), the component (B), the component (C), the component (D) which is added if needed, and other additives is formed by mixing these components together. Then, the obtained primer composition for optical article is coated on optical substrate to form the coating formed from the primer composition for optical article. Then, by curing the coating, the primer layer is formed. By doing so, the primary multilayer body having the primer layer on the optical substrate is produced. Basically, the primer layer is formed by above mentioned method, and a method of curing differs depending on the type of the used component (A), hence it is described in below.

<Method of Forming Primer Layer Using Moisture Curing Polymer Including Component (A')>

In the present invention, a method of coating the primer composition for optical article to the optical substrate (plastic lens) is not particularly limited, and a method such as a dip coating, a spin coating, a dip spin coating, a flow coating, and the like may be mentioned. Among these, a spin coating is preferably used since a coating with good appearance is easily obtained. In case the primer composition is coated by a spin coating method, since a primer layer with uniform thickness can be easily obtained, a viscosity of the primer composition for optical article at 23° C. is preferably regulated to 1 to 100 cP, and particularly to 2 to 50 cP. The viscosity can be regulated by the type and the amount of the component (C).

In the present invention, the primer composition for optical article is coated on the optical substrate, then the coated primer composition for optical article is cured (dried), thereby the primer layer (coating) can be formed. In case the component (A) is terminal end isocyanate type urethane prepolymer, the primer layer is cured by reacting with moisture in air. Therefore, after coating the primer composition for optical article, the component (C) may be dried in atmosphere, but in order to dry faster without influencing the optical substrate, it may be heated.

In the present invention, when removing the component (C) in the coating made of the primer composition for optical article, as mentioned in above, it may be heated within the range which does not influence the optical substrate. A temperature for forming the primer layer is specifically within the range of room temperature (23° C.) to 150° C. When the temperature is within this range, deformation and decoloring of the optical article due to heating can be suppressed. A length of time for heating is not particularly limited, and usually it is 1 minute to 3 hours and preferably 1 minute to 1 hour. When the component (A) is the terminal end isocyanate type urethane prepolymer, the primer layer can be formed under the condition of the temperature range of 23 to 50° C. and humidity of 30 to 90%. Note that, in order to further stabilize the formed primer layer, the heating treatment may be carried out at the range of 70 to 120° C. for 1 to 5 hours.

<Method for Forming Primer Layer by Two Liquid Type Primer Including (A') and (E')>

When using the two liquid type primer made of the terminal end isocyanate type urethane prepolymer and the curing agent (E'), the curing agent (component (E')) having plurality of groups capable of reacting with the isocyanate group and the terminal end isocyanate type urethane prepolymer in the molecule are mixed in advance for use. A method for mixing of the terminal end isocyanate type urethane prepolymer and the component (E') is not particularly limited, and a method of stirring two components right before using and a method of mixing two components by an in-line mixer such as a static mixer may be mentioned.

A mixture obtained by mixing the terminal end isocyanate type urethane prepolymer and the component (E') may be coated on the optical substrate by a known means such as a spin coating, a spray coating, a dip coating, a dip spin coating, a flow coating, and the like to form the coating. Among these, it is preferably coated by a spin coating and a spray coating.

By removing the component (C) from the formed coating, the primer layer can be formed. By removing the component (C) from the mixture, the reaction between the terminal end isocyanate type urethane prepolymer and the component (E') is facilitated and curing proceeds. It may be heated in order to further facilitate the curing reaction. The temperature for forming the primer layer is preferably between the range of room temperature (23° C.) to 150° C. The length of time for heating is not particularly limited, and usually it is 5 minutes to 3 hours and preferably 5 minutes to 1 hour.

<Method for Forming Primer Layer by Two Liquid Type Primer Including (A") and (E')>

When the component (A) is urethane prepolymer having hydroxyl group at the terminal end (component (A")), the component (A") and the curing agent (component (E)) having plurality of isocyanate groups are mixed in advance for use.

Note that, for a method of mixing, a method of coating the obtained mixture, and a method of forming the primer layer (heating temperature and the like), same methods of mixing the terminal end isocyanate type urethane prepolymer and the component (E') as mentioned in above can be used.

<Property of Formed Primer Layer>

Considering the light-absorbing property and the smoothness of the formed primer layer, the primer layer formed by above method is preferably 0.1 to 20 μm, more preferably 1 to 15 μm, and even more preferably 2 to 10 μm; however, it is not particularly limited thereto.

In the present invention, depending on the type of the component (B), the primer layer attains ultraviolet absorbing property, blue light absorbing property, or anti-glare property, and also combination of these properties. In a conventional method, a light-absorbing compound is blended in a hard coat layer or a light-absorbing compound is blended in the substrate. On the contrary to this, by using the primer composition for optical article satisfying the constitution of the present invention, it is possible to form a layer having excellent ultraviolet absorbing property, blue light absorbing property, and anti-glare property while still exhibiting the function as the primer layer.

In the present invention, after forming the primer layer on the substrate by the above mentioned method, a hard coat layer may be formed on the primer layer (a method of forming the secondary multilayer body). Next, a method of forming this secondary multilayer body is described.

<Method of Forming Secondary Multilayer Body>

It is preferable to form a hard coat layer to the primary multilayer body produced by the above mentioned method. This hard coat layer preferably includes inorganic particles, particularly inorganic oxide particles. Further, this hard coat layer is preferably a layer obtained by curing a coating composition (hereinafter, it may be mentioned as "hard coat composition") including inorganic particles and hydrolyzable group containing organosilicon compound.

As the organic particles used for the hard coat composition, silica sol, inorganic oxides, or composite inorganic oxide fine particles can be used without any limitation. A blending amount of the inorganic particles may be determined accordingly depending on the type of the organic particles, desired physical properties of the hard coat layer obtained at the end, and the purpose of use. In general, the blending amount of the inorganic particles is adjusted together with the used amount of other components so that a ratio of the organic particles occupying the hard coat layer formed at the end is 20 to 80 mass % and particularly 40 to 60 mass %.

The hydrolyzable group containing organosilicon compound has a function as a binder of the inorganic particles and it forms a transparent cured body which is a matrix in the hard coat layer. Further, polymerizable organosilicon compound is used. The polymerizable organosilicon compound has alkoxyl group which is a functional group, and the aforementioned known hydrolyzable group containing organosilicon compound can be used without any limitation. The organosilicon compound can be used alone or by combining two or more thereof. The organosilicon compound may be used in a form of which at least part of the organosilicon compound is hydrolyzed; or in a form of partial condensate of which the partially hydrolyzed product is condensed. In the present invention, from the point of adhesion and crosslinking property with the plastic lens, γ-glycidoxypropyltrimethoxysilane, γ-glycidoxypropylmethyldimethoxysilane, tetraethoxylane, partial hydrolysates or condensates thereof, and the like are suitably used.

In this hard coat composition, the hydrolyzable group containing organosilicon compound hydrolyzes, and this hydrolyzed product takes in the inorganic particles and undergoes polymerization curing (polycondensation) to form a cured body which becomes the matrix, thereby it is thought to form the hard coat layer in which the inorganic particles are dispersed in the matrix. Thus, in order to form this cured body, water is necessary to facilitate hydrolyzation of the hydrolyzable group containing organosilicon compound.

Water used for such purpose may be added in a form of acidic aqueous solution. For example, inorganic acids such as hydrochloric acid, sulfuric acid, nitric acid, phosphoric acid; and organic acids such as acetic acid, propionic acid, and the like may be added in a form of aqueous solution.

A curing catalyst may be blended to the hard coat composition in order to facilitate curing of the hydrolyzed product of the hydrolyzable group containing organosilicon compound. As this curing catalyst, for example those already known, such as acetylacetonate complex, perchlorate, organometallic salt, and various Lewis acids are used, and these may be used alone or it may be used by mixing two or more thereof.

As specific examples of acetylacetonate complex, aluminum acetylacetonate and the like may be mentioned.

As specific examples of perchlorate, magnesium perchlorate, aluminum perchlorate, zinc perchlorate, ammonium perchlorate, and the like may be mentioned.

Also, the hard coat composition can be blended with organic solvent. This organic solvent becomes a solvent of the hydrolyzable group containing organosilicon compound and also may become a dispersant for the inorganic particles. A known organic solvent can be used as long as it has such functions and a volatility. As specific examples of such organic solvent, alcohols such as methanol, ethanol, propanol, isopropanol, butanol, diacetone alcohol, and the like; lower alcohol esters of lower carboxylic acids such as methyl acetate, ethyl acetate, propyl acetate, and the like; ethers such as cellosolve, dioxane, ethylene glycol monoisopropyl ether, and the like; ketones such as acetone, methyl ethyl ketone, methyl isobutyl ketone, acetylacetone, and the like; halogenated hydrocarbons such as methylene chloride and the like; and aromatic hydrocarbons such as benzene, toluene, xylene, and the like may be mentioned. These organic solvents may be used alone or by combining two or more thereof.

The hard coat composition can be produced by mixing the above mentioned components in a known method. The hydrolyzable group containing organosilicon compound is preferably completely hydrolyzed then mixed with other components. A thickness of the hard coat layer is preferably 1 to 4 μm. By doing so, the secondary multilayer body formed with the hard coat layer is formed on the primer layer of the primary multilayer body.

In conventional technology, the light-absorbing agent was blended to the hard coat layer to provide a light-absorbing property. However, as mentioned in above, the main component of the hard coat layer is formed by inorganic particles and hydrolyzable group containing organosilicon compound; thus, it is thought that bleeding of the light-absorbing agent easily occurred. According to the present invention, such problem can be solved. Note that, in the present invention, a hard coat layer having an appropriate amount of light-absorbing agent may be formed.

<Other Layers>

Also, the secondary multilayer body may be subjected to post-processing if needed such as a thin layer formation by deposition of metal oxides such as $SiO_2$, $TiO_2$, $ZrO_2$, and the like; an anti-reflection treatment by a thin film formed by coating organic macromolecule; anti-static treatment; and the like.

EXAMPLES

Next, the present invention is described using examples and comparative examples, but the present invention is not to be limited thereto. First, a measuring device and a method of production of each component are described.

Example 1

<Production of Primer Composition for Optical Article>

An urethane prepolymer having isocyanate group at a terminal end was obtained by reacting 281 g of polytetramethylene ether glycol ("PTMG1000" manufactured by Mitsubishi Chemical Corporation) having a number average molecular weight of 1000 (component (A2)); 23 g of 1,2, 6-hexanetriol (component (A2)); 175 g of mixed product of 2,4-tolylene diisocyanate and 2,6-tolylene diisocyanate in a ratio of 80 mass %:20 mass % (hereinafter, this mixed product may be referred as TDI 80; (component (A1)). Hereinafter, this urethane prepolymer may be referred as "urethane prepolymer (1)". The urethane prepolymer (1) corresponds to a component (A) and includes isocyanate group, thus it can be cured by moisture in air, and further it may be cured using a curing agent (E').

The obtained urethane prepolymer (1) was diluted by ethyl acetate (component (C)). Here, 233 parts by mass of the component (C) was used with respect to 100 parts by mass of the urethane prepolymer (1). As a leveling agent (D), 0.1 parts by mass of a leveling agent "L7001" made by Dow Corning Toray Co., Ltd which is a silicone based leveling agent was added and it was thoroughly stirred until it was uniform under nitrogen atmosphere, thereby urethane prepolymer solution was obtained. A content of isocyanate group in this urethane prepolymer was 0.088 g per 1 g of the urethane prepolymer (1). A mol percentage of the isocyanate group in the urethane prepolymer (1) was 0.19 mol %.

<Weight Average Molecular Weight of Urethane Prepolymer>

The weight average molecular weight of the urethane prepolymer (1) was measured under following condition by Gel Permeation Chromatography (GPC measurement). For GPC measurement, liquid chromatography system (made by WATERS) was used. For columns, Shodex GPC KD-806M made by SHOWA DENKO K.K. (size exclusion limit molecular weight: 200,000,000) was used. For a developing solution, dimethylformamide (DMF) was used, and measured at a flow rate of 1 ml/min and temperature of 40° C. As a standard sample, polystyrene was used; and the weight average molecular weight and the number average molecular weight were obtained by a comparison conversion. Note that, as a detecting apparatus, a differential refractometer was used. Note that, the urethane prepolymer (1) was treated with butylamine in advance to inactivate the isocyanate group then it was subjected to measurement. The weight average molecular weight of the urethane prepolymer (1) obtained by this method was 12,000 and the number average molecular weight was 7,000.

To 333 parts by mass of this urethane prepolymer solution (100 parts by mass of the urethane prepolymer (1)), 10 parts by mass of a component (B2); "ADK STAB LA-36" made by ADEKA CORPORATION which is benzotriazole based ultraviolet absorbing agent (local maximum light-absorption wavelength of 355 nm, absorption coefficient of 45 (L/(g·cm)), full width half maximum of 85 nm) and 0.02 parts by mass of a component (B31); "Diaresin Blue J" made by Mitsubishi Chemical Corporation (local maximum light-absorption wavelength of 590 nm, absorption coefficient of 35 (L/(g·cm)), full width half maximum of 110 nm) were added, then thoroughly stirred and mixed until it was uniform under nitrogen atmosphere, thereby the primer composition for optical article was obtained. The weight average molecular weight, the number average molecular weight, and the blending amount of each component are shown in Table 1.

<Method of Forming Primer Layer; Production of Primary Multilayer Body>

As an optical substrate, CR-39 (acrylic resin plastic lens; refractive index=1.50) having a thickness of 2.0 mm was used. This optical substrate was thoroughly degreased by acetone and immersed in 10 mass % sodium hydroxide aqueous solution of 50° C. for 10 minutes. Then, it was thoroughly washed by warm water and dried using drier at 70° C. for 30 minutes. The primer composition for optical article obtained by the above mentioned method was spin coated to this optical article (plastic lens) using a Spin Coater 1H-DX2 made by MIKASA, then dried for 1 hour under the condition of 25° C. 50% RH; thereby the primary multilayer body formed with primer layer on the plastic lens was produced. Here, the thickness of the primer layer was adjusted to 5 to 7 μm. The primary multilayer body was evaluated as described in below.

[Method of Evaluating Samples]

1) Evaluation of Appearance of Primary Multilayer Body

The obtained primary multilayer body was observed using an optical microscope to evaluate the appearance. Evaluation standard is shown in below.

A: Uniform appearance and no defect observed.
B: Very small defect observed in appearance.
C: Partial appearance defect observed.
D: Appearance defect observed over entire primary multilayer body.

The appearance of the primary multilayer body produced by the above method was evaluated as "A".

2) Adhesion of Primary Multilayer Body

Adhesion was evaluated by a Cross-cut test method according to JISD-0202. That is, using a retractable knife, the surface of the primer layer of the obtained primary multilayer body was cut in 1 mm interval to form a lattice pattern having 100 squares. Then, CELLOTAPE™ (made by NICHIBAN Co., Ltd.) was firmly adhered to the surface of the primary multilayer having cuts, and tensile peeling was done by pulling to 90° direction from the surface, then a number of squares of the lattice pattern which was left with the primer layer was counted. Adhesion of the primary multilayer body produced by the above method was 100.

3) Ultraviolet Absorbing Property and Blue Light Absorbing Property

Ultraviolet absorbing property and blue light absorbing property were evaluated by measuring UV-vis spectrum of the obtained primary multilayer body. Regarding the primary multilayer body obtained by the above mentioned method had a transmittance (T %) at 400 nm and 420 nm of 2% and 78% respectively.

(Forming Hard Coat Layer; Production of Secondary Multilayer Body)

<Production of Hard Coat Composition>

12.2 g of t-butanol, 7.0 g of ethylene glycol monobutyl ether, 3.7 g of acetylacetone, 0.41 g of methyltriethoxysilane, 18.9 g of γ-glycidoxypropyltrimethoxysilane, and 0.06 g of silicone surfactant (Product name: L-7001 made by Toray Dow Corning Co., Ltd.) were mixed and stirred for 30 minutes at room temperature. Further, 9.0 g of 0.05 N hydrochloric acid was added and stirred for another 1 hour.

3.2 g of 0.1 N trimethylammonium chloride of methanol solution was further added and stirred for 1 hour at room temperature. Then, 44.3 g of methanol silica sol (solid concentration 30 wt %) and 0.51 g of aluminum acetylacetonate were added and matured for whole day and night, thereby the hard coat composition was obtained.

<Production of Secondary Multilayer Body>

The hard coat layer was formed (the secondary multilayer body was produced) by following method on the primer layer of the primary multilayer body produced according to the above mentioned "A Method of Forming Primer Layer; Production of Primary Multilayer Body".

The primary multilayer body was immersed in the hard coat composition, and pulled out in a pulling rate of 30 cm/min, thereby the hard coat composition was coated on both surfaces of the primary multilayer body. After coating, it was dried at 80° C. for 20 minutes, then it was cured by maintaining at 120° C. for 4 hours, thereby the hard coat layer was formed. The obtained hard coat layer was a colorless transparent coating having a thickness of about 2 μm.

4) Evaluation of Appearance of Secondary Multilayer Body

As similar to the above described 1), appearance was evaluated. The appearance of the secondary multilayer body having the hard coat layer produced by the above mentioned method was evaluated as "B". It is thought that part of the primer layer may have dissolved by the organic solvent in the hard coat composition.

5) Adhesion of Secondary Multilayer Body

Adhesion was evaluated as similar to the above described 2). The adhesion of the secondary multilayer body having the hard coat layer produced by the above mentioned method was 100.

6) Ultraviolet Absorbing Property and Blue Light Absorbing Property of Secondary Multilayer Body The ultraviolet absorbing property and the blue light absorbing property were also evaluated as similar to the above described 3). The secondary multilayer body produced by the above method had a transmittance (T %) at 400 nm and 420 nm of 2% and 79% respectively.

7) Scratch Resistance Evaluation of Secondary Multilayer Body

The scratch resistance of the hard coat layer coated on the primer layer of the primary multilayer body was evaluated by a following method. Using a steel wool (Bonstar #0000 made by NIPPON STEEL WOOL CO., LTD.), the surface of the lens (the surface of the hard coat layer) was scratched for 10 reciprocating moves while applying 1 kg of load, then degree of scratch was evaluated by visual observation. It was evaluated as described in below.

A: Scratch is barely formed.
B: Very small scratch formed.
C: Slightly scratched.
D: Obvious scratch formed.
E: Hard coat layer is peeled off.

The scratch resistance of the secondary multilayer body having the hard coat layer produced by the above method was "A".

Results of above mentioned 1) to 7) are shown in Table 2.

Example 2

The urethane prepolymer (1) of Example 1 was diluted with toluene (component (C)). Here, 100 parts by mass of the component (C) was used with respect to 100 parts by mass of the urethane prepolymer (1). Then, propylene glycol (component (A3)) was further added to this so that the added amount of the component (A3) was 1.3 parts by mass with respect to 100 parts by mass of the urethane prepolymer (1); and then reacted for 5 hours at 80° C. to obtain urethane prepolymer (2). Further, as the leveling agent (component (D)), 0.05 parts by mass of a leveling agent "FZ2123" made by Dow Corning Toray Co., Ltd. which is a fluorine based leveling agent was added and thoroughly stirred until it was uniform under nitrogen atmosphere, thereby urethane prepolymer solution was obtained. In this urethane prepolymer solution, a content of the isocyanate group was 0.064 g per 1 g of the urethane prepolymer (2), a mol percentage of the isocyanate group in the urethane prepolymer (2) was 0.14 mol %, a weight average molecular weight was 33,000, and a number average molecular weight was 14,000. The solvent of this urethane prepolymer solution was concentrated under reduced pressure and solvent exchange was carried out to tetrahydrofuran (component (C)). As a solvent amount, 300 parts by mass of the component (C) was used with respect to 100 parts by mass of the urethane prepolymer (2). Then, to 400 parts by mass of this urethane prepolymer solution (100 parts by mass of the urethane prepolymer (2)), as the component (B), 2 parts by mass of the component (B2); bezotriazle based ultraviolet absorbing agent (local maximum light-absorption wavelength of 370 nm, absorption coefficient of 60 (L/(g·cm)), and full width half maximum of 70 nm) and 15 parts by mass of the component (B2); benzotriazole based ultraviolet absorbing agent (local maximum light-absorption wavelength of 355 nm, absorption coefficient of 50 (L/(g·cm)), and full width half maximum of 90 nm) were added; and furthermore 0.04 parts by mass of the component (B31); "Diaresin Blue J" made by Mitsubishi Chemical Corporation (local maximum light-absorption wavelength of 590 nm, absorption coefficient of 35 (L/(g·cm)), and full width half maximum of 110 nm) was added. Then, these were mixed by thoroughly stirring until it was uniform under nitrogen atmosphere, thereby the primer composition for optical article was obtained. The weight average molecular weight and the number average molecular weight of the component (A); and the blending amount of each component are shown in Table 1.

The multilayer body having the primer multilayer body and the hard coat layer was produced as similar to Example 1 except for using the above mentioned primer composition, and the sample was evaluated. Results are shown in Table 2.

Example 3

A primer composition including urethane prepolymer (3) was obtained by the same method as Example 2 except for using 250 g of 4,4'-diphenylmethane diisocyanate as the component (A1). In this urethane prepolymer solution, a content of isocyanate group was 0.061 g per 1 g of the urethane prepolymer (3), a mol percentage of isocyanate group in the urethane prepolymer (3) was 0.16 mol %, a weight average molecular weight was 28,000, and a number average molecular weight was 12,500. The multilayer body having the primer multilayer body and the hard coat layer was produced as same as Example 1 except for using MR-8 (thiourethane resin plastic lens; refractive index=1.60) having a thickness of 2.0 mm as the optical substrate. Then, evaluations were carried out. The weight average molecular weight and the number average molecular weight of the component (A); and the blending amount of each component are shown in Table 1. Results of evaluations of each multilayer body is shown in Table 2.

Example 4

To 333 parts by mass of the primer composition of Example 1 (including 100 parts by mass of the component (A)), 28 parts by mass of 3,3'-dichloro-4,4'-diaminodiphenyl methane as a curing agent (component (E')) was added and stirred for 15 minutes at room temperature, thereby the primer composition of a two liquid curing type was obtained. As the optical substrate, CR-39 (acrylic resin plastic lens; refractive index=1.50) having a thickness of 2.0 mm was used. This optical substrate was thoroughly degreased by acetone and immersed in 10 mass % sodium hydroxide aqueous solution at 50° C. for 10 minutes, then thoroughly washed with warm water, followed by heat drying for 30 minutes at 70° C. The above mentioned primer composition was spin coated to this plastic lens using a Spin Coater 1H-DX2 made by MIKASA, then dried for 30 minutes at 70° C., thereby the primer multilayer body was obtained. Also, the thickness of the primer layer was adjusted to 5 to 7 μm. The multilayer body having the hard coat layer was produced as same as Example 1 on this primer multilayer body, then evaluations were carried out to the sample. The weight average molecular weight and the number average molecular weight of the component (A); and the blending amount of each are shown in Table 1. Results of evaluations of each multilayer body are shown in Table 2.

TABLE 1

| | Property of Component (A) | | | | Blending ratio (parts by mass) | | | | |
|---|---|---|---|---|---|---|---|---|---|
| Type of Component (A) | Content of isocyanate group * (g) | Content of isocyanate group (mol %) | Weight average molecular weight | Number average molecular weight | Component (A) | Component (B) | Component (C) | Component (D) | (E), (E') |
| Example 1 | Urethane prepolymer (1) | 0.088 | 0.19 | 12,000 | 7,000 | 100 | B2:10 B31:0.02 | 233 | 0.1 | — |
| Example 2 | Urethane prepolymer (2) | 0.064 | 0.14 | 33,000 | 14,000 | 100 | B2:17 B31:0.04 | 300 | 0.05 | — |
| Example 3 | Urethane prepolymer (3) | 0.061 | 0.16 | 28,000 | 12,500 | 100 | B2:17 B31:0.04 | 300 | 0.05 | — |
| Example 4 | Urethane prepolymer (1) | 0.088 | 0.19 | 12,000 | 7,000 | 100 | B2:10 B31:0.02 | 233 | 0.1 | Component (E') 28 |

* mass of isocyanate group per 1 g of component (A)

TABLE 2

| | Optical substrate | Primary multilayer body | | | | Secondary multilayer body | | | | |
|---|---|---|---|---|---|---|---|---|---|---|
| | | | | Transmittance | | | | Anti-scratch property | Transmittance | |
| | | Appearance | Adhesion | 400 nm | 420 nm | Appearance | Adhesion | | 400 nm | 420 nm |
| Example 1 | CR39 | A | 100 | 2% | 78% | B | 100 | A | 2% | 79% |
| Example 2 | CR39 | A | 100 | 0% | 40% | A | 100 | A | 0% | 40% |
| Example 3 | MR8 | A | 100 | 0% | 37% | A | 100 | A | 0% | 37% |
| Example 4 | CR39 | A | 100 | 3% | 77% | A | 95 | A | 3% | 76% |

Comparative Example 1

For comparison, a primer composition was prepared as similar to Example 1 except for not adding the ultraviolet absorbing agent (component (B2)) and the dye (component (B31)), then a multilayer body having a primer multilayer body and a hard coat layer was produced. Then, evaluations of the sample were carried out. The weight average molecular weight of the component (A); and the blending amount of each component are shown in Table 3. Results of evaluations of each multilayer body is shown in Table 4. Results are shown in Table 3.

Comparative Example 2

281 g of polytetramethylene ether glycol (component (A2)) having a number average molecular weight of 1000 ("PTMG1000" made by Mitsubishi Chemical Corporation), 23 g of 1,2,6-hexanetriol (component (A2)), and 175 g of a mixture of 2,4-tolylene diisocyanate and 2,6-tolylene diisocyanate in a ratio of 80 mass %:20 mass % (TDI 80; component (A1)) were reacted, then 32 g of methanol was further reacted; thereby polyurethane compound was obtained. This polyurethane compound is end-terminated polyurethane which does not have isocyanate group and hydroxyl group; and a weight average molecular weight was 13,000 and a number average molecular weight was 8,000.

This end-terminated polyurethane was diluted by tetrahydrofuran (component (C)). Here, 233 parts by mass of the component (C) was used with respect to 100 parts by mass of the end-terminated polyurethane. Further, as a leveling agent, 0.05 parts by mass of "FZ2123" made by Dow Corning Toray Co., Ltd. which is a fluorine based leveling agent was added and thoroughly stirred to obtain polyurethane solution. To 100 parts by mass of the end-terminated polyurethane of this polyurethane solution, as the component (B), 2 parts by mass of the component (B2); bezotriazle based ultraviolet absorbing agent (local maximum light-absorption wavelength of 370 nm, absorption coefficient of 60 (L/(g·cm)), and full width half maximum of 70 nm) and 8 parts by mass of the component (B2); benzotriazole based ultraviolet absorbing agent (local maximum light-absorption wavelength of 355 nm, absorption coefficient of 50 (L/(g·cm)), and full width half maximum of 90 nm) were added; and furthermore 0.04 parts by mass of the component (B31); "Diaresin Blue J" made by Mitsubishi Chemical Corporation (local maximum light-absorption wavelength of 590 nm, absorption coefficient of 35 (L/(g·cm)), and full width half maximum of 110 nm) was added. Then, these were mixed by thoroughly stirring, thereby polyurethane composition (composition corresponding to the primer composition for optical article) was obtained.

Using the polyurethane composition as the primer composition for optical article, the multilayer body having the primer multilayer body and the hard coat layer was produced as same as Example 2, and evaluations were carried out. The results of evaluations are shown in Table 4. For the hard coat multilayer body, significant appearance defect was found. In Table 3, the weight average molecular weight and the number average molecular weight of polyurethane component; and the blending amount of each component are shown. Table 4 shows evaluation results of each multilayer body.

Reference Example

Comparative Example 3

(Preparation of Hard Coat Composition)

12.2 g of t-butanol, 7.0 g of ethylene glycol monobutyl ether, 3.7 g of acetylacetone, 0.41 g of methyltriethoxysilane, 18.9 g of γ-glycidoxypropyltrimethoxysilane, and 0.06 g of silicone surfactant (product name "L-7001" made by Dow Corning Toray Co., Ltd.) were mixed and stirred for 30 minutes at room temperature. Further, 9.0 g of 0.5 N hydrochloric acid was added and stirred for 1 hour. Next, 3.2 g of 0.1 N trimethylammonium chloride in methanol was added and stirred for 1 hour at room temperature. Then, 44.3 g of methanol silica sol and 0.51 g of aluminum acetylacetonate were added and matured for whole day and night, thereby the hard coat composition was obtained.

To 100 parts by mass of this hard coat composition, 3.0 parts by mass of "ADK STAB LA-36" made by ADEKA CORPORATION which is benzotriazole based ultraviolet absorbing agent (local maximum light-absorption wavelength of 355 nm, absorption coefficient of 45 (L/(g·cm)), full width half maximum of 85 nm) (component (B2)) was added and thoroughly stirred until uniform, thereby the hard coat composition having ultraviolet absorbing agent was obtained.

(Method of Forming Hard Coat Layer)

As the optical substrate, CR-39 (acrylic resin plastic lens; refractive index=1.50) having a thickness of 2.0 mm was used. This optical substrate was thoroughly degreased by acetone and immersed in 10 mass % sodium hydroxide aqueous solution of 50° C. for 10 minutes. Then, it was thoroughly washed by warm water and heat dried at 70° C. for 30 minutes. This plastic lens was immersed in the above mentioned hard coat composition including the ultraviolet absorbing agent. Then, it was pulled out in a pulling rate of 30 cm/min, thereby the hard coat composition was coated on the surface of the lens. After coating, it was dried at 80° C. for 20 minutes, then it was cured by maintaining at 120° C. for 4 hours, thereby the hard coat layer was formed. The obtained hard coat layer was a colorless transparent coating having a thickness of about 2 μm.

The ultraviolet absorbing property of this multilayer body was evaluated, and a transmittance (T %) at 400 and 420 nm were 35% and 88% respectively, which are not sufficient ultraviolet absorbing property. Results are shown in Table 4.

Comparative Example 4

The multilayer body having the primer multilayer body and the hard coat layer was produced as same as Comparative example 2 except for using MR-8 (thiourethane resin plastic lens; refractive index=1.60) having a thickness of 2.0 mm as the optical substrate. Then, evaluations were carried out. The weight average molecular weight and the number average molecular weight of the component (A); and the blending amount of each component are shown in Table 3. Results of evaluations of each multilayer body are shown in Table 4.

TABLE 3

| | | Property of polyurethane component | | | | Blending ratio (parts by mass) | | | | |
|---|---|---|---|---|---|---|---|---|---|---|
| | Type of polyurethane | Content of isocyanate group * (g) | Content of isocyanate group (mol %) | Weight average molecular weight | Number average molecular weight | Component (A) | Component (B) | Component (C) | Component (D) | (E), (E') |
| Comparative example 1 | Urethane prepolymer (1) | 0.088 | 0.19 | 12,000 | 7,000 | 100 | — | 233 | 0.1 | — |
| Comparative example 2 | End-terminated polyurethane | 0 | 0 | 13,000 | 8,000 | 100 | B2:10 B31:0.04 | 233 | 0.05 | — |
| Comparative example 3 | | | | Component (B) blended in hard coat composition | | | | | | |
| Comparative example 4 | End-terminated polyurethane | 0 | 0 | 13,000 | 8,000 | 100 | B2:10 B31:0.04 | 233 | 0.05 | — |

* mass of isocyanate group per 1 g of polyurethane

TABLE 4

| | | Primary multilayer body | | | | Secondary multilayer body | | | | |
|---|---|---|---|---|---|---|---|---|---|---|
| | Optical substrate | Appearance | Adhesion | Transmittance 400 nm | Transmittance 420 nm | Appearance | Adhesion | Anti-scratch property | Transmittance 400 nm | Transmittance 420 nm |
| Comparative example 1 | CR39 | A | 100 | 81% | 87% | A | 100 | A | 45% | 90% |
| Comparative example 2 | CR39 | A | 95 | 4% | 42% | D | 25 | D | 10% | 64% |
| Comparative example 3 | CR39 | — | — | — | — | B | 75 | C | 35% | 88% |
| Comparative example 4 | MR8 | A | 94 | 0% | 35% | D | 10 | D | 9% | 59% |

Example 5A

The urethane prepolymer (1) of Example 1 was diluted by toluene (component (C)). Here, 100 parts by mass of the component (C) was used with respect to 100 parts by mass of the urethane prepolymer (1). Then, propylene glycol (component (A3)) was further added to this so that the added amount of the component (A3) was 1.2 parts by mass with respect to 100 parts by mass of the urethane prepolymer (1)

and reacted for 5 hours at 80° C. to obtain urethane prepolymer (5A). Further, as the leveling agent (component (D)), 0.05 parts by mass of a leveling agent "FZ2123" made by Dow Corning Toray Co., Ltd. which is a fluorine based leveling agent was added and thoroughly stirred until it was uniform under nitrogen atmosphere, thereby urethane prepolymer solution was obtained. In this urethane prepolymer solution, a content of isocyanate group was 0.075 g per 1 g of the urethane prepolymer (5A), a mol percentage of isocyanate group in the urethane prepolymer (5A) was 0.17 mol %, a weight average molecular weight was 22,000, and a number average molecular weight was 13,000. This urethane prepolymer solution was further diluted by ethyl acetate (component (C)). As the solvent, 100 parts by mass of ethyl acetate of the component (C) was used with respect to 100 parts by mass of the urethane prepolymer (5A). As a result, a total amount of the component (C) was 200 parts by mass with respect to 100 parts by mass of the urethane prepolymer (5A). Then, to 300 parts by mass of this urethane prepolymer solution (100 parts by mass of urethane prepolymer (5A)), as the component (B), 2 parts by mass of component (B2); benzotriazole based ultraviolet absorbing agent (local maximum light-absorption wavelength of 370 nm, absorption coefficient of 60 (L/(g·cm)), and full width half maximum of 70 nm) and 8 parts by mass of benzotriazole based ultraviolet absorbing agent (local maximum light-absorption wavelength of 355 nm, absorption coefficient of 50 (L/(g·cm)), and full width half maximum of 90 nm) were added; and furthermore 0.04 parts by mass of the component (B31); "Diaresin Blue J" made by Mitsubishi Chemical Corporation (local maximum light-absorption wavelength of 590 nm, absorption coefficient of 35 (L/(g·cm)), and full width half maximum of 110 nm) was added. Then, these were mixed by thoroughly stirring until it was uniform under nitrogen atmosphere, thereby the primer composition for optical article was obtained. As the optical substrate, CR-39 (acrylic resin plastic lens; refractive index=1.50) having a thickness of 2.0 mm was used.

The multilayer body having the primer multilayer body and the hard coat layer was produced as same as Example 1 except for using the above mentioned primer composition, and evaluations were carried. The weight average molecular weight and the number average molecular weight of the component (A); and the blending amount of each component are shown in Table 5. Results of evaluations of each multilayer body are shown in Table 8.

Example 5B 200 g of polytetramethylene ether glycol (component (A2)) having a number average molecular weight of 1000 ("PTMG1000" made by Mitsubishi Chemical Corporation), 10 g of 1,2,6-hexanetriol (component (A2)), and 195 g of a mixture of 2,4-tolylene diisocyanate and 2,6-tolylene diisocyanate in a ratio of 80 mass %:20 mass % (TDI 80; component (A1)) were reacted, thereby urethane prepolymer (5B) having isocyanate group at terminal end was obtained (includes 100 parts by mass of toluene (component (C)). The obtained urethane prepolymer (5B) was diluted with 100 parts by mass of ethyl acetate (component (C)). As a result, a total amount of the component (C) was 200 parts by mass with respect to 100 parts by mass of the urethane prepolymer. Further, as the leveling agent (component (D)), 0.05 parts by mass of a leveling agent "FZ2123" made by Dow Corning Toray Co., Ltd. which is a fluorine based leveling agent was added and thoroughly stirred until it was uniform under nitrogen atmosphere, thereby urethane prepolymer solution was obtained. In this urethane prepolymer solution, a content of isocyanate group was 0.15 g per 1 g of the urethane prepolymer (5B), a mol percentage of isocyanate group in the urethane prepolymer (5B) was 0.36 mol %, a weight average molecular weight was 6,000, and a number average molecular weight was 3,500. Then, to 300 parts by mass of this urethane prepolymer solution (100 parts by mass of the urethane prepolymer (5B)), the same amount of the component (B) as Example 5A was added, and the primer composition was obtained by the same method as Example 5A. Also, the multilayer body having the primer multilayer body and the hard coat layer was produced as same as Example 5A, and evaluations were carried out. The weight average molecular weight and the number average molecular weight of the component (A); and the blending amount of each component are shown in Table 5. Results of evaluations of each multilayer body are shown in Table 8.

Example 5C

The urethane prepolymer (5A) of Example 5A was diluted by toluene (component (C)). As the solvent, 100 parts by mass of the component (C) was used with respect to 100 parts by mass of the urethane prepolymer (5A). Then, propylene glycol (component (A3)) was further added to this so that the added amount of the component (A3) was 3.5 parts by mass with respect to 100 parts by mass of the urethane prepolymer (5A); and reacted for 5 hours at 80° C. to obtain urethane prepolymer (5C). Further, as the leveling agent (component (D)), 0.05 parts by mass of a leveling agent "FZ2123" made by Dow Corning Toray Co., Ltd. which is a fluorine based leveling agent was added and thoroughly stirred until it was uniform under nitrogen atmosphere, thereby urethane prepolymer solution was obtained. In this urethane prepolymer solution, a content of isocyanate group was 0.038 g per 1 g of the urethane prepolymer (5C), a mol percentage of isocyanate group in the urethane prepolymer (5C) was 0.09 mol %, a weight average molecular weight was 122,000, and a number average molecular weight was 19,000. This urethane prepolymer solution was diluted by ethyl acetate (component (C)). 100 parts by mass of ethyl acetate of the component (C) was used with respect to 100 parts by mass of the urethane prepolymer (5C). As a result, a total amount of the component (C) was 200 parts by mass with respect to 100 parts by mass of the urethane prepolymer (5C). Then, to 300 parts by mass of this urethane prepolymer solution (100 parts by mass of the urethane prepolymer (5C)), the same amount of the component (B) as Example 5A was added, and the primer composition was obtained by the same method as Example 5A. Also, the multilayer body having the primer multilayer body and the hard coat layer was produced as same as Example 5A, and evaluations were carried out. The weight average molecular weight and the number average molecular weight of the component (A); and the blending amount of each component are shown in Table 5. Results of evaluations of each multilayer body are shown in Table 8.

Example 6A

As the component (B), instead of using the component (B2), 0.1 parts by mass of a component (B1); porphyrin compound: "FDB-001" made by YAMADA CHEMICAL CO., LTD (local maximum light-absorption wavelength of 420 nm, absorption coefficient of 510 (L/(g·cm)), and full width half maximum of 18 nm) was used. Other than using this component (B1), the primer composition was obtained by the same method as Example 5A (the same amount as Example 5A of the component (B31) was blended). The multilayer body having the primer multilayer body and the hard coat layer was produced as same Example 5A except that MR-8 (thiourethane resin plastic lens; refractive index=1.60) having a thickness of 2.0 mm was used as the optical substrate and evaluations were carried out. The weight average molecular weight and the number average molecular weight of the component (A); and the blending amount of each component are shown in Table 5. Results of evaluations of each multilayer body are shown in Table 8.

Example 6B

Except for using the urethane prepolymer (5B) obtained in Example 5B, the same procedure as Example 6A was carried out and the multilayer body having the primer multilayer body and the hard coat layer was produced; and evaluations were carried out. The weight average molecular weight and the number average molecular weight of the component (A); and the blending amount of each component are shown in Table 5. Results of evaluations of each multilayer body are shown in Table 8.

Example 6C

Except for using the urethane prepolymer (5C) obtained in Example 5C, the same procedure as Example 6A was carried out and the multilayer body having the primer multilayer body and the hard coat layer was produced; and evaluations were carried out. The weight average molecular weight and the number average molecular weight of the component (A); and the blending amount of each component are shown in Table 5. Results of evaluations of each multilayer body are shown in Table 8.

Example 7A

As the component (B), 0.15 parts by mass of the component (B1); porphyrin compound: "FDB-002" made by YAMADA CHEMICAL CO., LTD (local maximum light-absorption wavelength of 431 nm, absorption coefficient of 380 (L/(g·cm)), and full width half maximum of 18 nm) and 9 parts by mass of the component (B2); benzotriazole based ultraviolet absorbing agent (local maximum light-absorption wavelength of 355 nm, absorption coefficient of 50 (L/(g·cm)), and full width half maximum of 90 nm) were used. Other than this, the primer composition was obtained by the same method as Example 5A (the same amount as Example 5A of the component (B31) was blended). The multilayer body having the primer multilayer body and the hard coat layer was produced as same as Example 5A except that MR-8 (thiourethane resin plastic lens; refractive index=1.60) having a thickness of 2.0 mm was used as the optical substrate; and evaluations were carried out. The weight average molecular weight and the number average molecular weight of the component (A); and the blending amount of each component are shown in Table 5. Results of evaluations of each multilayer body are shown in Table 8.

Example 7B

Except for using the urethane prepolymer (5B) obtained in Example 5B, the same procedure as Example 7A was carried out and the multilayer body having the primer multilayer body and the hard coat layer was produced and evaluations were carried out. The weight average molecular weight and the number average molecular weight of the component (A); and the blending amount of each component are shown in Table 5. Results of evaluations of each multilayer body are shown in Table 8.

Example 7C

Except for using the urethane prepolymer (5C) obtained in Example 5C, the same procedure as Example 7A was carried out and the multilayer body having the primer multilayer body and the hard coat layer was produced and evaluations were carried out. The weight average molecular weight and the number average molecular weight of the component (A); and the blending amount of each component are shown in Table 5. Results of evaluations of each multilayer body are shown in Table 8.

Example 8

As the component (B), instead of using the component (B2), 0.03 parts by mass of the component (B1); porphyrin compound: "FDB-001" made by YAMADA CHEMICAL CO., LTD (local maximum light-absorption wavelength of 420 nm, absorption coefficient of 510 (L/(g·cm)), and full width half maximum of 18 nm) was used. Other than this, the primer composition was obtained by the same method as Example 5A (the same amount of the component (B31) as Example 5A was blended). The multilayer body having the primer multilayer body and the hard coat layer was produced as same as Example 5A except that MR-8 (thiourethane resin plastic lens; refractive index=1.60) having a thickness of 2.0 mm was used as the optical substrate and evaluations were carried out. The weight average molecular weight and the number average molecular weight of the component (A); and the blending amount of each component are shown in Table 6. Results of evaluations of each multilayer body are shown in Table 8.

Example 9

As the component (B), 0.03 parts by mass of the component (B1); porphyrin compound: "FDB-002" made by YAMADA CHEMICAL CO., LTD (local maximum light-absorption wavelength of 431 nm, absorption coefficient of 380 (L/(g·cm)), and full width half maximum of 18 nm) and 7 parts by mass of the component (B2); benzotriazole based ultraviolet absorbing agent (local maximum light-absorption wavelength of 355 nm, absorption coefficient of 50 (L/(g·cm)), and full width half maximum of 90 nm) were used. Other than this, the primer composition was obtained by the same method as Example 5A (the same amount of the component (B3) was blended as Example 5A). The multilayer body having the primer multilayer body and the hard coat layer was produced as same as Example 5A except that MR-8 (thiourethane resin plastic lens; refractive index=1.60) having a thickness of 2.0 mm was used as the optical substrate and evaluations were carried out. The weight average molecular weight and the number average molecular weight t of the component (A); and the blending amount of each component are shown in Table 6. Results of evaluations of each multilayer body are shown in Table 8.

Example 10

As the component (B), 0.03 parts by mass of the component (B1); porphyrin compound: "FDB-001" made by YAMADA CHEMICAL CO., LTD (local maximum light-absorption wavelength of 420 nm, mol absorption coefficient of 510 (L/(g·cm)), and full width half maximum of 18 nm) and 2 parts by mass of the component (B2); benzotriazole based ultraviolet absorbing agent (local maximum light-absorption wavelength of 370 nm, absorption coefficient of 60 (L/(g·cm)), and full width half maximum of 70 nm) were used. Other than this, the primer composition was obtained by the same method as Example 5A (the same amount of the component (B31) as Example 5A was blended). The multilayer body having the primer multilayer body and the hard coat layer was produced as same as Example 5A and evaluations were carried out. The weight average molecular weight and the number average molecular weight of the component (A); and the blending amount of each component are shown in Table 6. Results of evaluations of each multilayer body are shown in Table 8.

Example 11

As the component (B), instead of using the component (B2), 2 parts by mass of the component (B1); merocyanine compound: "FDB-009" made by YAMADA CHEMICAL CO., LTD (local maximum light-absorption wavelength of 401 nm, absorption coefficient of 130 (L/(g·cm)), and full width half maximum of 40 nm) was used. Other than this, the primer composition was obtained by the same method as Example 5A (the same amount of the component (B31) as Example 5A was blended). The multilayer body having the primer multilayer body and the hard coat layer was produced as same as Example 5A except that MR-8 (thiourethane resin plastic lens; refractive index=1.60) having a thickness of 2.0 mm was used as the optical substrate and evaluations were carried out. The weight average molecular weight and the number average molecular weight of the component (A); and the blending amount of each component are shown in Table 6. Results of evaluations of each multilayer body are shown in Table 8.

Example 12

As the component (B), instead of using the component (B2), 0.5 parts by mass of the component (B1); merocyanine compound: "FDB-009" made by YAMADA CHEMICAL CO., LTD (local maximum light-absorption wavelength of 401 nm, absorption coefficient of 130 (L/(g·cm)), and full width half maximum of 40 nm) and 0.05 parts by mass of the component (B1); porphyrin compound: "FDB-001" made by YAMADA CHEMICAL CO., LTD (local maximum light-absorption wavelength of 420 nm, mol absorption coefficient of 510 (L/(g·cm)), and full width half maximum of 18 nm) were used. Other than this, the primer composition was obtained by the same method as Example 5A (the same amount of the component (B31) as Example 5A was blended). The multilayer body having the primer multilayer body and the hard coat layer was produced as similar to Example 5A except that MR-8 (thiourethane resin plastic lens; refractive index=1.60) having a thickness of 2.0 mm was used as the optical substrate; and evaluations were carried out. The weight average molecular weight and the number average molecular weight of the component (A); and the blending amount of each component are shown in Table 6. Results of evaluations of each multilayer body are shown in Table 8.

Example 13

As the component (B), 0.1 parts by mass of the component (B1); porphyrin compound: "FDB-001" made by YAMADA CHEMICAL CO., LTD (local maximum light-absorption wavelength of 420 nm, absorption coefficient of 510 (L/(g·cm)), and full width half maximum of 18 nm) and 0.03 part by mass of a dye (component (B3)); "Diaresin Violet RR" made by Mitsubishi Chemical Corporation (local maximum light-absorption wavelength of 550 nm, absorption coefficient of 50 (L/(g·cm)), and full width half maximum of 105 nm) were used; furthermore, toluene was used instead of ethyl acetate. Other than this, the primer composition was obtained by the same method as Example 5A. The multilayer body having the primer multilayer body and the hard coat layer was produced as same as Example 5A except that MR-8 (thiourethane resin plastic lens; refractive index=1.60) having a thickness of 2.0 mm was used as the optical substrate and evaluations were carried out. The weight average molecular weight and the number average molecular weight of the component (A); and the blending amount of each component are shown in Table 6. Results of evaluations of each multilayer body are shown in Table 8.

Example 14

To 200 parts by mass of the urethane prepolymer (5A) solution prepared in Example 5A (including 100 parts by mass of the urethane prepolymer (5A) and 100 parts by mass of toluene as the component (C)), 28 parts by mass of 3,3'-dichloro-4,4'-diaminodiphenylmethane as the curing agent (component (E)) was added at room temperature and stirred for 15 minutes to obtain the two liquid type primer composition. As the component (B), 0.1 parts by mass of the component (B1); porphyrin compound: "FDB-001" made by YAMADA CHEMICAL CO., LTD (local maximum light-absorption wavelength of 420 nm, absorption coefficient of 510 (L/(g·cm)), and full width half maximum of 18 nm) was used. Other than this, the primer composition was obtained by the same method as Example 5A (the same amount of the component (B31) as Example 5A was blended). The multilayer body having the primer multilayer body and the hard coat layer was produced as same as Example 5A except that MR-8 (thiourethane resin plastic lens; refractive index=1.60) having a thickness of 2.0 mm was used as the optical substrate and evaluations were carried out. The weight average molecular weight and the number average molecular weight of the component (A); and the blending amount of each component are shown in Table 7. Results of evaluations of each multilayer body are shown in Table 8.

Example 15

Using the urethane prepolymer (5C) of Example 5C, to 300 parts by mass of this urethane prepolymer solution (100 parts by mass of the urethane prepolymer (5C)); as the component (B), 2 parts by mass of the component (B2); benzotriazole based ultraviolet absorbing agent (local maximum light-absorption wavelength of 370 nm, absorption coefficient of 60 (L/(g·cm)), and full width half maximum of 70 nm) and 10 parts by mass of the component (B2); benzotriazole based ultraviolet absorbing agent (local maximum light-absorption wavelength of 355 nm, absorption coefficient of 50 (L/(g·cm)), and full width half maximum of 90 nm) were added. Other than this, the primer composition was obtained by the same method as Example 5A (the same amount of the component (B31) as Example 5A was blended). The multilayer body having the primer multilayer body and the hard coat layer was produced as same as Example 5A except that MR-8 (thiourethane resin plastic lens; refractive index=1.60) having a thickness of 2.0 mm was used as the optical substrate and evaluations were carried out. The weight average molecular weight and the number average molecular weight of the component (A); and the blending amount of each component are shown in Table 7. Results of evaluations of each multilayer body is shown in Table 8.

Example 16

The urethane prepolymer (5A) of Example 5A was diluted by toluene (component (C)). As the solvent, 100 parts by mass of toluene as the component (C) was used with respect to 100 parts by mass of the urethane prepolymer (5A). Then, 1,4-butanediol (component (A3)) was further added to this so that the added amount of the component (A3) was 1.3 parts by mass with respect to 100 parts by mass of the urethane prepolymer (5A) and reacted for 5 hours at 80° C. to obtain urethane prepolymer (16). Further, as the leveling agent (component (D)), 0.05 parts by mass of a leveling agent "FZ2104" made by Dow Corning Toray Co., Ltd. which is a fluorine based leveling agent was added and thoroughly stirred until it was uniform under nitrogen atmosphere, thereby urethane prepolymer solution was obtained. In this urethane prepolymer solution, a content of isocyanate group was 0.078 g per 1 g of the urethane prepolymer (16), a mol percentage of isocyanate group in the urethane prepolymer (16) was 0.17 mol %, a weight average molecular weight was 21,000, and a number average molecular weight was 12,000. This urethane prepolymer solution was diluted by ethyl acetate (component (C)). 100 parts by mass of ethyl acetate as the component (C) was used with respect to 100 parts by mass of the urethane prepolymer (16). As a result, a total amount of the component (C) was 200 parts by mass with respect to 100 parts by mass of the urethane prepolymer (5C). To 300 parts by mass of this urethane prepolymer solution (100 parts by mass of the urethane prepolymer (16)), as the component (B), 0.05 parts by mass of the component (B1); porphyrin compound: "FDB-001" made by YAMADA CHEMICAL CO., LTD (local maximum light-absorption wavelength of 420 nm, absorption coefficient of 510 (L/(g·cm)), and full width half maximum of 18 nm) and 0.04 parts by mass of the component (B31); "Diaresin Blue J" made by Mitsubishi Chemical Corporation (local maximum light-absorption wavelength of 590 nm, absorption coefficient of 35 (L/(g·cm)), and full width half maximum of 110 nm) were added and stirred until uniform under nitrogen atmosphere, thereby the primer composition for optical article was obtained. The multilayer body having the primer multilayer body and the hard coat layer was produced as same as Example 5A except that MR-8 (thiourethane resin plastic lens; refractive index=1.60) having a thickness of 2.0 mm was used as the optical substrate and evaluations were carried out. The weight average molecular weight and the number average molecular weight of the component (A); and the blending amount of each component are shown in Table 7. Results of evaluations of each multilayer body are shown in Table 8.

Example 17

The primer composition was obtained by the same method as in Example 5A, except for using, as the component (B), 0.1 parts by mass of the component (B1); porphyrin compound: "Cobalt (II) Tetraphenylporphyrin" made by Tokyo Kasei Industry (local maximum light-absorption wavelength of 410 nm, absorption coefficient of 650 (L/(g·cm)), and full width half maximum of 20 nm) and 0.03 parts by mass of the component (B31); "Diaresin Violet RR" made by Mitsubishi Chemical Corporation (local maximum light-absorption wavelength of 550 nm, absorption coefficient of 50 (L/(g·cm)), and full width half maximum of 105 nm); and also toluene was used in place of ethyl acetate. The multilayer body having the primer multilayer body and the hard coat layer was produced as same as Example 5A except that as the optical substrate, MR-8 (thiourethane resin plastic lens; refractive index=1.60) having a thickness of 2.0 mm was used and evaluations were carried out. The weight average molecular weight and the number average molecular weight of the component (A); and the blending amount of each component are shown in Table 7. Results of evaluations of each multilayer body are shown in Table 8.

Example 18

The primer composition was obtained by the same method as in Example 5A, except for using as the component (B), 0.05 parts by mass of the component (B1); porphyrin compound: "Zinc (II) Tetraphenylporphyrin" (local maximum light-absorption wavelength of 425 nm, absorption coefficient of 800 (L/(g·cm)), and full width half maximum of 22 nm), and 0.03 parts by mass of the component (B31) "Diaresin Violet RR" made by Mitsubishi Chemical Corporation (local maximum light-absorption wavelength of 550 nm, absorption coefficient of 50 (L/(g·cm)), and full width half maximum of 105 nm); and also toluene was used in place of ethyl acetate. The multilayer body having the primer multilayer body and the hard coat layer was produced as same as Example 5A except that MR-8 (thiourethane resin plastic lens; refractive index=1.60) having a thickness of 2.0 mm was used as the optical substrate and evaluations were carried out. The weight average molecular weight and the number average molecular weight of the component (A); and the blending amount of each component are shown in Table 7. Results of evaluations of each multilayer body are shown in Table 8.

Example 19

The primer composition was obtained by the same method as in Example 5A, except for, using as the component (B), 0.15 parts by mass of the component (B1); porphyrin compound: "2,3,7,8,12,13,17,18-Octaethyl-21H, 23H-porphine Zinc (II)" (local maximum light-absorption wavelength of 411 nm, absorption coefficient of 300 (L/(g·cm)), and full width half maximum of 25 nm) and 0.03 parts by mass of the component (B31); "Diaresin Violet RR" made by Mitsubishi Chemical Corporation (local maximum light-absorption wavelength of 550 nm, absorption coefficient of 50 (L/(g·cm)), and full width half maximum of 105 nm); and also toluene was used in place of ethyl acetate. The multilayer body having the primer multilayer body and the hard coat layer was produced as same as Example 5A except that MR-8 (thiourethane resin plastic lens; refractive index=1.60) having a thickness of 2.0 mm was used as the optical substrate and evaluations were carried out. The weight average molecular weight and the number average molecular weight of the component (A); and the blending amount of each component are shown in Table 7. Results of evaluations of each multilayer body are shown in Table 8.

Example 20

The primer composition was obtained by the same method as in Example 5A except for using, as the component (B), 1.5 parts by mass of the component (B1); "Kayaset Yellow GN" made by Nippon Kayaku Co., Ltd (local maximum light-absorption wavelength of 408 nm, mol absorption coefficient of 60 (L/(g·cm)), and full width half maximum of 90 nm) and 0.8 parts by mass of the component (B31); "Diaresin Blue J" made by Mitsubishi Chemical Corporation (local maximum light-absorption wavelength of 590 nm, absorption coefficient of 35 (L/(g·cm)), and full width half maximum of 110 nm). The multilayer body having the primer multilayer body and the hard coat layer was produced as same as Example 5A except that MR-8 (thiourethane resin plastic lens; refractive index=1.60) having a thickness of 2.0 mm was used as the optical substrate and evaluations were carried out. The weight average molecular weight and the number average molecular weight of the component (A); and the blending amount of each component are shown in Table 7. Results of evaluations of each multilayer body are shown in Table 8. When the above mentioned component (B1) was used, YI increased, hence the added amount of the bluing agent increased. Thus, the obtained multilayer body had relatively a low transparency (luminous transmittance).

TABLE 5

| | Property of Component (A) | | | | | | | | |
|---|---|---|---|---|---|---|---|---|---|
| | Type of Component (A) | Content of isocyanate group* (g) | Content of isocyanate group (mol %) | Weight average molecular weight | Number average molecular weight | Blending ratio (parts by mass) | | | |
| | | | | | | Component (A) | Component (B) | Component (C) | Component (D) | (E), (E') |
| Example 5A | Urethane prepolymer (5A) | 0.075 | 0.17 | 22,000 | 13,000 | 100 | B2:10 B31:0.04 | 200 | 0.05 | — |
| Example 5B | Urethane prepolymer (5B) | 0.15 | 0.36 | 6,000 | 3,500 | 100 | B2:10 B31:0.04 | 200 | 0.05 | — |
| Example 5C | Urethane prepolymer (5C) | 0.038 | 0.09 | 122,000 | 19,000 | 100 | B2:10 B31:0.04 | 200 | 0.05 | — |
| Example 6A | Urethane prepolymer (5A) | 0.075 | 0.17 | 22,000 | 13,000 | 100 | B1:0.1 B31:0.04 | 200 | 0.05 | — |
| Example 6B | Urethane prepolymer (5B) | 0.15 | 0.36 | 6,000 | 3,500 | 100 | B1:0.1 B31:0.04 | 200 | 0.05 | — |
| Example 6C | Urethane prepolymer (5C) | 0.038 | 0.09 | 122,000 | 19,000 | 100 | B1:0.1 B31:0.04 | 200 | 0.05 | — |
| Example 7A | Urethane prepolymer (5A) | 0.075 | 0.17 | 22,000 | 13,000 | 100 | B1:0.15 B2:9 B31:0.04 | 200 | 0.05 | — |
| Example 7B | Urethane prepolymer (5B) | 0.15 | 0.36 | 6,000 | 3,500 | 100 | B1:0.15 B2:9 B31:0.04 | 200 | 0.05 | — |
| Example 7C | Urethane prepolymer (5C) | 0.038 | 0.09 | 122,000 | 19,000 | 100 | B1:0.15 B2:9 B31:0.04 | 200 | 0.05 | — |

TABLE 6

| | Property of Component (A) | | | | | | | | |
|---|---|---|---|---|---|---|---|---|---|
| | Type of Component (A) | Content of isocyanate group* (g) | Content of isocyanate group (mol %) | Weight average molecular weight | Number average molecular weight | Blending ratio (parts by mass) | | | |
| | | | | | | Component (A) | Component (B) | Component (C) | Component (D) | (E), (E') |
| Example 8 | Urethane prepolymer (5A) | 0.075 | 0.17 | 22,000 | 13,000 | 100 | B1:0.03 B31:0.04 | 200 | 0.05 | — |
| Example 9 | Urethane prepolymer (5A) | 0.075 | 0.17 | 22,000 | 13,000 | 100 | B1:0.03 B2:7 B31:0.04 | 200 | 0.05 | — |
| Example 10 | Urethane prepolymer (5A) | 0.075 | 0.17 | 22,000 | 13,000 | 100 | B1:0.03 B2:2 B31:0.04 | 200 | 0.05 | — |
| Example 11 | Urethane prepolymer (5A) | 0.075 | 0.17 | 22,000 | 13,000 | 100 | B1:2 B31:0.04 | 200 | 0.05 | — |
| Example 12 | Urethane prepolymer (5A) | 0.075 | 0.17 | 22,000 | 13,000 | 100 | B1:0.55 B31:0.04 | 200 | 0.05 | — |
| Example 13 | Urethane prepolymer (5A) | 0.075 | 0.17 | 22,000 | 13,000 | 100 | B1:0.1 B31:0.03 | 200 | 0.05 | — |

*mass of isocyanate group per 1 g of polyurethane component

TABLE 7

| | Type of Component (A) | Property of Component (A) | | | | Blending ratio (parts by mass) | | | | |
|---|---|---|---|---|---|---|---|---|---|---|
| | | Content of isocyanate group* (g) | Content of isocyanate group (mol %) | Weight average molecular weight | Number average molecular weight | Component (A) | Component (B) | Component (C) | Component (D) | (E), (E') |
| Example 14 | Urethane prepolymer (5A) | 0.075 | 0.17 | 22,000 | 13,000 | 100 | B1:0.1 B31:0.04 | 100 | 0.05 | Component (E') 28 |
| Example 15 | Urethane prepolymer (5C) | 0.038 | 0.09 | 122,000 | 19,000 | 100 | B2:12 B31:0.04 | 200 | 0.05 | — |
| Example 16 | Urethane prepolymer (16) | 0.078 | 0.17 | 21,000 | 12,000 | 100 | B1:0.05 B31:0.04 | 200 | 0.05 | — |
| Example 17 | Urethane prepolymer (5A) | 0.075 | 0.17 | 22,000 | 13,000 | 100 | B1:0.1 B31:0.03 | 200 | 0.05 | — |
| Example 18 | Urethane prepolymer (5A) | 0.075 | 0.17 | 22,000 | 13,000 | 100 | B1:0.05 B31:0.03 | 200 | 0.05 | — |
| Example 19 | Urethane prepolymer (5A) | 0.075 | 0.17 | 22,000 | 13,000 | 100 | B1:0.15 B31:0.03 | 200 | 0.05 | — |
| Example 20 | Urethane prepolymer (5A) | 0.075 | 0.17 | 22,000 | 13,000 | 100 | B1:1.5 B31:0.8 | 200 | 0.05 | — |

*mass of isocyanate group per 1 g of polyurethane component

TABLE 8

| | | Primary multilayer body | | | | Secondary multilayer body | | | | |
|---|---|---|---|---|---|---|---|---|---|---|
| | Optical substrate | Appearance | Adhesion | Transmittance 400 nm | Transmittance 420 nm | Appearance | Adhesion | Anti-scratch property | Transmittance 400 nm | Transmittance 420 nm |
| Example 5A | CR39 | A | 100 | 2% | 71% | A | 100 | A | 2% | 72% |
| Example 5B | CR39 | B | 100 | 2% | 71% | B | 100 | C | 4% | 74% |
| Example 5C | CR39 | A | 100 | 2% | 71% | B | 96 | A | 2% | 72% |
| Example 6A | MR8 | A | 100 | 6% | 30% | A | 100 | A | 6% | 31% |
| Example 6B | MR8 | B | 100 | 6% | 30% | B | 97 | C | 9% | 34% |
| Example 6C | MR8 | A | 100 | 6% | 30% | B | 100 | A | 6% | 31% |
| Example 7A | MR8 | A | 100 | 1% | 45% | A | 100 | A | 1% | 46% |
| Example 7B | MR8 | B | 100 | 1% | 45% | B | 100 | C | 4% | 49% |
| Example 7C | MR8 | A | 100 | 1% | 45% | B | 95 | A | 1% | 46% |
| Example 8 | MR8 | A | 100 | 10% | 66% | A | 100 | A | 11% | 68% |
| Example 9 | MR8 | A | 100 | 1% | 64% | A | 100 | A | 1% | 64% |
| Example 10 | CR39 | A | 100 | 2% | 30% | A | 100 | A | 2% | 30% |
| Example 11 | MR8 | A | 100 | 1% | 60% | A | 100 | A | 1% | 61% |
| Example 12 | MR8 | A | 100 | 6% | 50% | A | 100 | A | 6% | 51% |
| Example 13 | MR8 | A | 100 | 7% | 38% | A | 100 | A | 7% | 38% |
| Example 14 | MR8 | A | 100 | 10% | 66% | A | 100 | A | 10% | 65% |
| Example 15 | MR8 | A | 100 | 1% | 62% | B | 97 | A | 1% | 63% |
| Example 16 | MR8 | A | 100 | 9% | 62% | A | 100 | A | 9% | 62% |
| Example 17 | MR8 | A | 100 | 2% | 49% | A | 100 | A | 2% | 49% |
| Example 18 | MR8 | A | 100 | 2% | 50% | A | 100 | A | 2% | 50% |
| Example 19 | MR8 | A | 100 | 2% | 55% | A | 100 | A | 2% | 55% |
| Example 20 | MR8 | A | 100 | 1% | 40% | A | 100 | A | 1% | 40% |

Note that, as shown in Table 5 to Table 7, although it may not be explicitly mentioned, the primer compositions for optical article of Examples 5A to 7C and Examples 8 to 20 were prepared by adding 0.05 parts by mass of a leveling agent "FZ2104" made by Dow Corning Toray Co., Ltd. which is a fluorine based leveling agent as the component (D).

Example 21

As similar to Example 5A, a solution of the urethane prepolymer (5A) was prepared. Then, to 300 parts by mass of this urethane prepolymer solution (100 parts by mass of the urethane prepolymer (5A)), as the component (B), 2 parts by mass of the component (B2); benzotriazole based ultraviolet absorbing agent (local maximum light-absorption wavelength of 365 nm, absorption coefficient of 55 (L/(g·cm)), and full width half maximum of 65 nm) and 7 parts by mass of the component (B2); benzotriazole based ultraviolet absorbing agent (local maximum light-absorption wavelength of 355 nm, absorption coefficient of 50 (L/(g·cm)), and full width half maximum of 90 nm) were added; and furthermore 0.1 parts by mass of the component (B32); "FDG-005" made by YAMADA CHEMICAL CO., LTD (local maximum light-absorption wavelength of 581 nm, absorption coefficient of 140 (L/(g·cm)), and full width half maximum of 19 nm) was added. Then, these were mixed by thoroughly stirring until it was uniform under nitrogen atmosphere, thereby the primer composition for optical article was obtained. As the optical substrate, CR-39 (acrylic resin plastic lens; refractive index=1.50) having a thickness of 2.0 mm was used.

Other than using the above primer composition, the multilayer body having the primer multilayer body and the hard coat layer was produced as same as Example 1 and evaluations were carried out. The weight average molecular weight, the number average molecular weight, and the blending amount of each component of the component (A) are shown in Table 9. Results of evaluations of each multilayer body are shown in Table 10.

Also, the lens was used indoor and outdoor, as a result, it was not bright even when the lens was used for a long period of time under LED illumination or under good weather. Further, outlines of branches of trees, contrast of red, yellow, and green were very clear.

Example 22

As the component (B), 0.12 parts by mass of the component (B1); porphyrin compound: "FDB-001" made by YAMADA CHEMICAL CO., LTD (local maximum light-absorption wavelength of 420 nm, absorption coefficient of 510 (L/(g·cm)), and full width half maximum of 18 nm) and 0.1 parts by mass of the component (B32); "FDG-007" made by YAMADA CHEMICAL CO., LTD (local maximum light-absorption wavelength of 591 nm, absorption coefficient of 145 (L/(g·cm)), and full width half maximum of 19 nm) were used. Other than this, the primer composition was obtained by the same method as Example 21. The multilayer body having the primer multilayer body and the hard coat layer was produced as same as Example 21 except that MR-8 (thiourethane resin plastic lens; refractive index=1.60) having a thickness of 2.0 mm was used as the optical substrate and evaluations were carried out. The weight average molecular weight and the number average molecular weight of the component (A); and the blending amount of each component are shown in Table 9. Results of evaluations of each multilayer body are shown in Table 10.

Also, the lens was used indoor and outdoor, as a result, it was not bright even when the lens was used for a long period of time under LED illumination or under good weather. Further, outlines of branches of trees, contrast of red, yellow, and green were very clear.

Example 23

As the component (B), 0.05 parts by mass of the component (B1); porphyrin compound: "FDB-001" made by YAMADA CHEMICAL CO., LTD (local maximum light-absorption wavelength of 420 nm, absorption coefficient of 510 (L/(g m)), and full width half maximum of 18 nm), 2 parts by mass of the component (B2); benzotriazole based ultraviolet absorbing agent (local maximum light-absorption wavelength of 365 nm, absorption coefficient of 55 (L/(g·cm)), and full width half maximum of 65 nm), and 0.3 parts by mass of component (B32); "FDG-005" made by YAMADA CHEMICAL CO., LTD (local maximum light-absorption wavelength of 581 nm, absorption coefficient of 140 (L/(g·cm)), and full width half maximum of 19 nm) were used. Other than this, the multilayer body having the primer multilayer body and the hard coat layer was produced as same as Example 22 and evaluations were carried out. The weight average molecular weight and the number average molecular weight of the component (A); and the blending amount of each component are shown in Table 9. Results of evaluations of each multilayer body are shown in Table 10.

Also, the lens was used indoor and outdoor, as a result, it was not bright even when the lens was used for a long period of time under LED illumination or under good weather. Further, outlines of branches of trees, contrast of red, yellow, and green were very clear.

Example 24

As the component (B), 0.05 parts by mass of the component (B1); porphyrin compound: "FDB-001" made by YAMADA CHEMICAL CO., LTD (local maximum light-absorption wavelength of 420 nm, absorption coefficient of 510 (L/(g·cm)), and full width half maximum of 18 nm) and 0.2 parts by mass of the component (B32); "PD-320" made by YAMAMOTO CHEMICAL CO., LTD (local maximum light-absorption wavelength of 590 nm, absorption coefficient of 135 (L/(g·cm)), and full width half maximum of 20 nm) were used; and also toluene was used in place of ethyl acetate. Other than this, the multilayer body having the primer multilayer body and the hard coat layer was produced as same as Example 22. The weight average molecular weight and the number average molecular weight of the component (A); and the blending amount of each component are shown in Table 9. Results of evaluations of each multilayer body are shown in Table 10.

Also, the lens was used indoor and outdoor, as a result, it was not bright even when the lens was used for a long period of time under LED illumination or under good weather. Further, outlines of branches of trees, contrast of red, yellow, and green were very clear.

Example 25

Two liquid type primer composition was obtained as similar to Example 14. The primer composition was obtained by the same method as Example 14 except for using, as the component (B), 0.1 parts by mass of the component (B1); porphyrin compound: "FDB-001" made by YAMADA CHEMICAL CO., LTD (local maximum light-absorption wavelength of 420 nm, absorption coefficient of 510 (L/(g·cm)), and full width half maximum of 18 nm) and 0.3 parts by mass of the component (B32); "FDG-005" made by YAMADA CHEMICAL CO., LTD (local maximum light-absorption wavelength of 581 nm, absorption coefficient of 140 (L/(g·cm)), and full width half maximum of 19 nm). Other than this, the multilayer body having the primer multilayer body and the hard coat layer was produced as same as Example 14. The weight average molecular weight and the number average molecular weight of the component (A); and the blending amount of each component are shown in Table 9. Results of evaluations of each multilayer body is shown in Table 10.

Also, the lens was used indoor and outdoor, as a result, it was not bright even when the lens was used for a long period of time under LED illumination or under good weather. Further, outlines of branches of trees, contrast of red, yellow, and green were very clear.

Example 26

Using the urethane prepolymer (5C) of Example 5C, to 300 parts by mass of this urethane prepolymer solution (100 parts by mass of the urethane prepolymer (5C)), as the component (B), 2 parts by mass of component (B2); benzotriazole based ultraviolet absorbing agent (local maximum light-absorption wavelength of 370 nm, absorption coefficient of 60 (L/(g·cm)), and full width half maximum of 70 nm), 0.1 parts by mass of the component (B1); porphyrin compound: "Zinc (II) Tetraphenylporphyrin" (local maximum light-absorption wavelength of 425 nm, absorption coefficient of 800 (L/(g·cm)), and full width half maximum of 22 nm), and 0.1 parts by mass of the component (B32); "FDG-007" made by YAMADA CHEMICAL CO., LTD (local maximum light-absorption wavelength of 591 nm, absorption coefficient of 145 (L/(g·cm)), and full width half maximum of 19 nm) were added and stirred until uniform under nitrogen atmosphere, thereby the primer composition for optical article was obtained. Using this composition, the multilayer body having the primer multilayer body and the hard coat layer was produced as same as Example 21. The weight average molecular weight and the number average molecular weight of the component (A); and the blending amount of each component are shown in Table 9. Results of evaluations of each multilayer body are shown in Table 10.

Also, the lens was used indoor and outdoor, as a result, it was not bright even when the lens was used for a long period of time under LED illumination or under good weather. Further, outlines of branches of trees, contrast of red, yellow, and green were very clear.

Example 27

The primer composition was obtained by the same method as in Example 21 except that, as the component (B), 0.08 parts by mass of the component (B1); porphyrin compound: "Zinc (II) Tetraphenylporphyrin" (local maximum light-absorption wavelength of 425 nm, absorption coefficient of 800 (L/(g·cm)), and full width half maximum of 22 nm) and 0.6 parts by mass of the component (B32); "FDG-006" made by YAMADA CHEMICAL CO., LTD (local maximum light-absorption wavelength 584 nm, absorption coefficient of 80 (L/(g·cm)), and full width half maximum of 25 nm) were added. Other than using this composition, the multilayer body having the primer multilayer body and the hard coat layer was produced as same as Example 22. The weight average molecular weight and the number average molecular weight of the component (A); and the blending amount of each component are shown in Table 9. Results of evaluations of each multilayer body are shown in Table 10.

Also, the lens was used indoor and outdoor, as a result, it was not bright even when the lens was used for a long period of time under LED illumination or under good weather. Further, outlines of branches of trees, contrast of red, yellow, and green were very clear.

Example 28

The primer composition was obtained by the same method as Example 21 except that as the component (B), 0.1 parts by mass of the component (B31); "Black B" made by Nippon Kayaku Co., Ltd (local maximum light-absorption wavelength of 600 nm, absorption coefficient of 40 (L/(g·cm)), and full width half maximum of 140 nm) was used instead of the component (B32) (the same amount of the component (B2) as Example 21 was used). Other than using this primer composition, the multilayer body having the primer multilayer body and the hard coat layer was produced as same as Example 22. The weight average molecular weight and the number average molecular weight of the component (A); and the blending amount of each component are shown in Table 9. Results of evaluations of each multilayer body are shown in Table 10.

Also, the lens was used indoor and outdoor, as a result, it was slightly bright when the lens was used for a long period of time under LED illumination or under good weather. Further, outlines of branches of trees, contrast of red, yellow, and green were very clear but color tone changed.

Example 29

The primer composition and the multilayer body having the primer multilayer body and hard coat layer were produced by the same method as Example 21 except for not using the component (B2), and as the component (B), 0.6 parts by mass of the component (B3); "FDG-006" made by YAMADA CHEMICAL CO., LTD (local maximum light-absorption wavelength of 584 nm, absorption coefficient of 80 (L/(g·cm)), and full width half maximum of 25 nm) was only used, then evaluations were carried out. The weight average molecular weight and the number average molecular weight of the component (A); and the blending amount of each component are shown in Table 9. Results of evaluations of each multilayer body are shown in Table 10.

Also, the lens was used indoor and outdoor, as a result, it was not bright even when the lens was used for a long period of time under LED illumination or under good weather. Further, outlines of branches of trees, contrast of red, yellow, and green were very clear.

TABLE 9

| | Property of Component (A) | | | | Blending ratio (parts by mass) | | | | |
|---|---|---|---|---|---|---|---|---|---|
| Type of Component (A) | Content of isocyanate group* (g) | Content of isocyanate group (mol %) | Weight average molecular weight | Number average molecular weight | Component (A) | Component (B) | Component (C) | Component (D) | (E), (E') |
| Exampe 21 | Urethane prepolymer (5A) | 0.075 | 0.17 | 22,000 | 13,000 | 100 | B2:9 B32:0.1 | 200 | 0.05 | — |
| Exampe 22 | Urethane prepolymer (5A) | 0.075 | 0.17 | 22,000 | 13,000 | 100 | B1:0.12 B32:0.1 | 200 | 0.05 | — |
| Exampe 23 | Urethane prepolymer (5A) | 0.075 | 0.17 | 22,000 | 13,000 | 100 | B1:0.05 B2:2 B32:0.3 | 200 | 0.05 | — |
| Exampe 24 | Urethane prepolymer (5A) | 0.075 | 0.17 | 22,000 | 13,000 | 100 | B1:0.05 B32:0.2 | 200 | 0.05 | — |

TABLE 9-continued

| | | Property of Component (A) | | | | Blending ratio (parts by mass) | | | | |
|---|---|---|---|---|---|---|---|---|---|---|
| | Type of Component (A) | Content of isocyanate group* (g) | Content of isocyanate group (mol %) | Weight average molecular weight | Number average molecular weight | Component (A) | Component (B) | Component (C) | Component (D) | (E), (E') |
| Exampe 25 | Urethane prepolymer (5A) | 0.075 | 0.17 | 22,000 | 13,000 | 100 | B1:0.1 B32:0.3 | 100 | 0.05 | Component (E') 28 |
| Exampe 26 | Urethane prepolymer (5C) | 0.038 | 0.09 | 122,000 | 19,000 | 100 | B1:0.1 B2:2 B32:0.1 | 200 | 0.05 | — |
| Exampe 27 | Urethane prepolymer (5A) | 0.075 | 0.17 | 22,000 | 13,000 | 100 | B1:0.08 B32:0.6 | 200 | 0.05 | — |
| Exampe 28 | Urethane prepolymer (5A) | 0.075 | 0.17 | 22,000 | 13,000 | 100 | B2:9 B31:0.1 | 200 | 0.05 | — |
| Exampe 29 | Urethane prepolymer (5A) | 0.075 | 0.17 | 22,000 | 13,000 | 100 | B32:0.6 | 200 | 0.05 | — |

*mass of isocyanate group per 1 g of polyurethane component

Note that, as shown in Table 9, although it may not be explicitly mentioned, the primer compositions for optical article of Examples 21 to 29 were prepared by adding 0.05 parts by mass of a leveling agent "FZ2104" made by Dow Corning Toray Co., Ltd. which is a fluorine based leveling agent as the component (D).

TABLE 10

| | | Primary multilayer body | | | | Secondary multilayer body | | | | |
|---|---|---|---|---|---|---|---|---|---|---|
| | Optical substrate | Appearance | Adhesion | Taransmittance | | Appearance | Adhesion | Anti-scratch property | Transmittance | |
| | | | | 400 nm | 420 nm | | | | 400 nm | 420 nm |
| Example 21 | CR39 | A | 100 | 4% | 71% | A | 100 | A | 4% | 72% |
| Example 22 | MR8 | A | 100 | 5% | 25% | A | 100 | A | 5% | 25% |
| Example 23 | MR8 | A | 100 | 1% | 27% | A | 100 | A | 1% | 28% |
| Example 24 | MR8 | A | 100 | 15% | 70% | A | 100 | A | 15% | 70% |
| Example 25 | MR8 | A | 100 | 10% | 66% | A | 100 | A | 10% | 66% |
| Example 26 | CR39 | A | 100 | 2% | 29% | A | 100 | A | 2% | 30% |
| Example 27 | MR8 | A | 100 | 2% | 45% | A | 100 | A | 2% | 45% |
| Example 28 | MR8 | A | 100 | 4% | 71% | A | 100 | A | 4% | 72% |
| Example 29 | CR39 | A | 100 | 87% | 90% | A | 100 | A | 87% | 90% |

Example 30

330 g of polytetramethylene ether glycol (component (A2)) having a number average molecular weight of 650 ("PTMG650" made by Mitsubishi Chemical Corporation) and 175 g of a mixture of 2,4-tolylene diisocyanate and 2,6-tolylene diisocyanate in a ratio of 80 mass %:20 mass % (TDI 80; component (A1)) were reacted, thereby urethane prepolymer (30') having isocyanate group at the terminal end was obtained. The obtained urethane prepolymer (30') was diluted with 100 parts by mass of toluene (component (C)). Then, propylene glycol (component (A3)) was further added to this so that the added amount of the component (A3) was 1.8 parts by mass with respect to 100 parts by mass of the urethane prepolymer (30') and reacted for 5 hours at 80° C. to obtain urethane prepolymer (30). Further, as the leveling agent (component (D)), 0.05 parts by mass of a leveling agent "FZ2123" made by Dow Corning Toray Co., Ltd. which is a fluorine based leveling agent was added and thoroughly stirred until it was uniform under nitrogen atmosphere, thereby urethane prepolymer solution was obtained. In this urethane prepolymer solution, a content of isocyanate group was 0.061 g per 1 g of the urethane prepolymer (30), a mol percentage of isocyanate group in the urethane prepolymer (30) was 0.15 mol %, a weight average molecular weight was 30,000, and a number average molecular weight was 14,000. This urethane prepolymer solution was diluted by ethyl acetate (component (C)). 100 parts by mass of ethyl acetate of the component (C) was used with respect to 100 parts by mass of the urethane prepolymer (30). As a result, a total amount of the component (C) was 200 parts by mass with respect to 100 parts by mass of the urethane prepolymer (30). Then, to 300 parts by mass of this urethane prepolymer solution (100 parts by mass of the urethane prepolymer (30)), the same amount of the component (B) was added as Example 5A, and the primer composition was obtained by the same method as Example 5A. Also, the multilayer body having the primer multilayer body and the hard coat layer was produced as same as Example 5A, and evaluations were carried out. The weight average molecular weight and the number average molecular weight of the component (A); and the blending amount of each component are shown in Table 11. Results of evaluations of each multilayer body are shown in Table 12.

Example 31

Using the urethane prepolymer (30) prepared in Example 30, the same amount of the component (B) as Example 6A was blended, and the primer composition was obtained by the same method as Example 6A. Also, the multilayer body having the primer multilayer body and the hard coat layer was produced as same as Example 6A, and evaluations were carried out. The weight average molecular weight and the number average molecular weight of the component (A); and the blending amount of each component are shown in Table 11. Results of evaluations of each multilayer body are shown in Table 12.

Example 32

Using the urethane prepolymer (30) prepared in Example 30, the same amount of the component (B) as Example 7A was blended, and the primer composition was obtained by the same method as Example 7A. Also, the multilayer body having the primer multilayer body and the hard coat layer was produced as same as Example 7A, and evaluations were carried out. The weight average molecular weight and the number average molecular weight of the component (A); and the blending amount of each component are shown in Table 11. Results of evaluations of each multilayer body are shown in Table 12.

TABLE 11

| | | Property of Component (A) | | | | Blending ratio (parts by mass) | | | | |
|---|---|---|---|---|---|---|---|---|---|---|
| | Type of Component (A) | Content of isocyanate group* (g) | Content of isocyanate group* (mol %) | Weight average molecular weight | Number average molecular weight | Component (A) | Component (B) | Component (C) | Component (D) | (E), (E') |
| Exmaple 30 | Urethane prepolymer (30) | 0.061 | 0.15 | 30,000 | 14,000 | 100 | B2:10 B31:0.04 | 200 | 0.05 | — |
| Exmaple 31 | Urethane prepolymer (31) | 0.061 | 0.15 | 30,000 | 14,000 | 100 | B1:0.1 B31:0.04 | 200 | 0.05 | — |
| Exmaple 32 | Urethane prepolymer (32) | 0.061 | 0.15 | 30,000 | 14,000 | 100 | B1:0.15 B2:9 B31:0.04 | 200 | 0.05 | — |

*mass of isocyanate group per 1 g of polyurethane component

Note that, as shown in Table 11, although it may not be explicitly mentioned, the primer compositions for optical article of Examples 30 to 32 were prepared by adding 0.05 parts by mass of a leveling agent "FZ2104" made by Dow Corning Toray Co., Ltd. which is a fluorine based leveling agent as the component (D).

TABLE 12

| | | Primary multilayer body | | | Secondary multilayer body | | | | |
|---|---|---|---|---|---|---|---|---|---|
| | Optical substrate | Appearance | Adhesion | Taransmittance 400 nm | Taransmittance 420 nm | Appearance | Adhesion | Anti-scratch property | Transmittance 400 nm | Transmittance 420 nm |
| Example 30 | CR39 | A | 100 | 2% | 71% | A | 100 | A | 2% | 72% |
| Example 31 | MR8 | A | 100 | 6% | 30% | A | 100 | A | 6% | 31% |
| Example 32 | MR8 | A | 100 | 1% | 45% | A | 100 | A | 1% | 46% |

What is claimed is:

1. A primer composition for an optical article comprising:
   a urethane prepolymer (A) which is a reaction product of an aromatic polyisocyanate compound and a polyol compound and has a reactive group at a terminal end selected from the group consisting of an isocyanate group and a hydroxyl group,
   a light-absorbing compound (B) having a local maximum light-absorption wavelength between 320 nm or more and 650 nm or less,
   an organic solvent (C) having a solubility parameter of 8 $[(cal/cm^3)^{1/2}]$ or more and has no active hydrogen, and
   wherein a weight average molecular weight of the urethane prepolymer (A) is 10,000 to 100,000.

2. The primer composition for the optical article according to claim 1, wherein a mass of the reactive group of the urethane prepolymer (A) is within a range of 0.02 to 0.2 g per 1 g of the urethane prepolymer (A).

3. The primer composition for the optical article according to claim 1 including 0.01 to 20 parts by mass of the light-absorbing compound (B) and 100 to 1000 parts by mass of the organic solvent (C) per 100 parts by mass of the urethane prepolymer (A).

4. The primer composition for the optical article according claim 1, wherein the urethane prepolymer (A) is a reaction product of an aromatic polyisocyanate compound, a polyol compound, and a chain extender.

5. The primer composition for the optical article according to claim 1, wherein the light-absorption compound (B) includes a component (B1) having a local maximum light-absorption wavelength of more than 400 nm and 450 nm or less.

6. The primer composition for the optical article according to claim 5, wherein the component (B1) includes a porphyrin compound.

7. The primer composition for the optical article according to claim 1, wherein the light-absorbing compound (B) includes an ultraviolet absorber (B2) having a maximum light-absorption wavelength of 320 nm or more and 400 nm or less.

8. The primer composition for the optical article according to claim 1, wherein the light-absorbing compound (B) further includes a dye (B3) having a maximum light-absorption wavelength of 540 nm or more and 650 nm or less.

9. The primer composition for the optical article according to claim 1 further including a leveling agent (D).

10. The primer composition for the optical article according to claim 1, wherein the reactive group of the urethane prepolymer (A) is an isocyanate group and the urethane prepolymer (A) is a moisture curing polymer which cures by moisture in air.

11. The primer composition for the optical article according to claim 1, wherein the reactive group of the urethane prepolymer (A) is a hydroxyl group and further includes a curing agent (E) having a plurality of isocyanate groups in a molecule.

12. The primer composition for the optical article according to claim 1, wherein the reactive group of the urethane prepolymer (A) is an isocyanate group and further includes a curing agent (E') having a plurality of functional groups reactable with an isocyanate group in a molecule.

13. A primary multilayer body having a primer layer made of the primer composition according to claim 1 on a surface of an optical substrate and a thickness of the primer layer is 0.1 to 20 μm.

14. The primary multilayer body according to claim 13, wherein a transmittance at a wavelength of 420 nm is 80% or less.

15. A secondary multilayer body having a hard coat layer including inorganic particles on the primer layer of the primary multilayer body according to claim 13.

16. The primer composition for an optical article according to claim 1, wherein the light-absorbing compound (B) includes:
 a dye (B3) having a maximum light-absorption wavelength of 540 nm or more and 650 nm or less, and
 at least one selected from the group consisting of a component (B1) having a local maximum light-absorption wavelength of more than 400 nm and 450 nm or less and an ultraviolet absorber (B2) having a maximum light-absorption wavelength of 320 nm or more and 400 nm or less.

* * * * *